United States Patent
Brugger et al.

(10) Patent No.: US 8,883,932 B2
(45) Date of Patent: Nov. 11, 2014

(54) MODIFIED ALKOXYLATION PRODUCTS HAVING AT LEAST ONE NON-TERMINAL ALKOXYSILYL GROUP, WITH INCREASED STORAGE LIFE AND INCREASED STRETCHABILITY OF THE POLYMERS PREPARED USING THEM

(75) Inventors: Bastian Matthias Brugger, Oberhausen (DE); Melanie Roessing, Oberhausen (DE); Matthias Lobert, Essen (DE); Frank Schubert, Neukirchen-Vluyn (DE); Tammo Boinowitz, Essen (DE); Michael Ferenz, Essen (DE)

(73) Assignee: Evonik Degussa GmbH, Essen (DE)

( * ) Notice: Subject to any disclaimer, the term of this patent is extended or adjusted under 35 U.S.C. 154(b) by 208 days.

(21) Appl. No.: 13/195,054

(22) Filed: Aug. 1, 2011

(65) Prior Publication Data

US 2012/0029090 A1 Feb. 2, 2012

(30) Foreign Application Priority Data

Aug. 2, 2010 (DE) .................. 10 2010 038 774

(51) Int. Cl.
| | | |
|---|---|---|
| B05D 3/02 | (2006.01) | |
| B32B 27/04 | (2006.01) | |
| C08G 65/336 | (2006.01) | |
| C08L 71/08 | (2006.01) | |
| C08L 71/10 | (2006.01) | |
| C09J 171/02 | (2006.01) | |
| C08G 65/26 | (2006.01) | |
| C08G 65/22 | (2006.01) | |

(52) U.S. Cl.
CPC ............ *C08G 65/22* (2013.01); *C08G 65/2663* (2013.01); *C08G 65/2609* (2013.01); *C08G 65/336* (2013.01)
USPC ........... 525/403; 427/387; 428/365; 428/447; 521/154; 524/588; 525/406; 525/407; 525/408; 528/212; 528/425

(58) Field of Classification Search
None
See application file for complete search history.

(56) References Cited

U.S. PATENT DOCUMENTS

| | | | | |
|---|---|---|---|---|
| 8,268,939 B2 * | 9/2012 | Ebbrecht et al. | ............... | 525/476 |
| 8,450,514 B2 * | 5/2013 | Schubert et al. | ............... | 556/445 |
| 8,779,079 B2 * | 7/2014 | Henning et al. | ............... | 524/588 |
| 2006/0223971 A1 * | 10/2006 | Yang et al. | ................... | 528/125 |
| 2007/0100153 A1 | 5/2007 | Brueckner et al. | | |
| 2007/0184006 A1 | 8/2007 | Ferenz et al. | | |
| 2007/0197678 A1 | 8/2007 | Cavaleiro et al. | | |
| 2008/0027202 A1 | 1/2008 | Ferenz et al. | | |
| 2008/0064782 A1 | 3/2008 | Doehler et al. | | |
| 2009/0137751 A1 | 5/2009 | Knott et al. | | |
| 2009/0137752 A1 | 5/2009 | Knott et al. | | |
| 2010/0034765 A1 | 2/2010 | Herrwerth et al. | | |
| 2010/0041910 A1 * | 2/2010 | Schubert et al. | ............... | 556/445 |
| 2010/0056818 A1 | 3/2010 | Ferenz et al. | | |
| 2010/0071849 A1 | 3/2010 | Knott et al. | | |
| 2010/0081781 A1 | 4/2010 | Schubert et al. | | |
| 2010/0105843 A1 | 4/2010 | Knott et al. | | |
| 2010/0113633 A1 | 5/2010 | Henning et al. | | |
| 2010/0168367 A1 | 7/2010 | Schubert et al. | | |
| 2010/0184913 A1 * | 7/2010 | Ebbrecht et al. | ............... | 524/588 |
| 2010/0210445 A1 | 8/2010 | Lipinski et al. | | |
| 2010/0266518 A1 | 10/2010 | Springer et al. | | |
| 2010/0266651 A1 | 10/2010 | Czech et al. | | |
| 2011/0021693 A1 * | 1/2011 | Henning et al. | ............... | 524/588 |
| 2011/0042004 A1 | 2/2011 | Schubert et al. | | |
| 2011/0046305 A1 | 2/2011 | Schubert et al. | | |

FOREIGN PATENT DOCUMENTS

| | | |
|---|---|---|
| EP | 0368195 | 5/1990 |
| EP | 2036938 | 3/2009 |
| EP | 2093244 | 8/2009 |
| EP | 2174971 | 4/2010 |
| EP | 2194086 | 6/2010 |
| EP | 2289961 | 3/2011 |
| EP | 2289976 | 3/2011 |
| WO | WO 2010/136279 | 12/2010 |
| WO | WO 2010/136280 | 12/2010 |

OTHER PUBLICATIONS

Tacke et al., "Neutral Mononuclear and Binuclear Hexacoordinate Silicon Complexes with SiO5C Skeletons," European Journal of Inorganic Chemistry, 2001, pp. 1671-1674.*
HCAPLUS accession No. 1996:653186 for Polish Patent No. 165,113, Urbaniak et al., Nov. 30, 1994, two pages.*
European Search Report for EP 11173394 dated Oct. 14, 2011.

* cited by examiner

*Primary Examiner* — Robert Sellers

(74) *Attorney, Agent, or Firm* — Frommer Lawrence & Haug LLP

(57) ABSTRACT

New alkoxylation products which carry alkoxysilyl groups, mostly in the form of (poly)ether alcohols or copolymers comprising polyether blocks, which are characterized in that the reactivity of the hydroxyl function is reduced, and also to processes for preparing them and to their use.

17 Claims, No Drawings

MODIFIED ALKOXYLATION PRODUCTS HAVING AT LEAST ONE NON-TERMINAL ALKOXYSILYL GROUP, WITH INCREASED STORAGE LIFE AND INCREASED STRETCHABILITY OF THE POLYMERS PREPARED USING THEM

Any foregoing applications, including German patent application DE 10 2010 038 774.6, filed on 2 Aug. 2010 and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

Alkoxylation products such as, for example, polyethers which carry alkoxysilyl groups, at least one alkoxysilyl group being present in blocklike or random distribution non-terminally in the chain of the polyether, and the polyether chain possessing at least one terminal OH group, are intended to maintain sufficient storage life in a sealant or adhesive formulation.

The invention relates to new alkoxylation products which carry alkoxysilyl groups, mostly in the form of (poly)ether alcohols or copolymers comprising polyether blocks, which are characterized in that the reactivity of the hydroxyl function is reduced, and also to processes for preparing them and to their use.

Conventional polyether alcohols, often also referred to for short simply as polyethers, and composed predominantly of propylene oxide and ethylene oxide, have been known for a long time and are produced industrially in large volumes. Among other uses, they serve, through reaction with polyisocyanates, as starting compounds for the production of polyurethanes, or alternatively for the production of surfactants.

Organic alkoxysilane compounds such as 3-glycidyloxypropyltrimethoxy- and -triethoxysilane, which are available, for example, under the trade names DYNASYLAN® GLYMO and DYNASYLAN® GLYEO (trade marks of Evonik Degussa GmbH), enter into the production of organically modified networks in the context of the sol-gel process, which, as a key operation, serves for the production of nanocomposites which yield coating systems having properties that are enhanced in terms of hardness and of resistance to scratching, abrasion, temperature, solvent, and acid. Alkoxysilane compounds, furthermore, enter diversely into sealants and adhesives, and also, generally, as reactive adhesion promoters and primers for various substrates such as metals, glass and glass fibres/glass fabrics for fibre-reinforced composite materials and for the surface treatment of, for example, pigments and fillers in coating materials.

There has been no lack of efforts to improve the profiles of properties of alkoxysilane compounds by means of chemical modifications, in order to open up yet further fields of application for this significant product class. For instance, the literature discloses combination of the profile of properties of alkoxylation products (polyethers) with those of crosslinkable compounds which carry alkoxysilyl groups especially. Thus DE 69831518 T2 is based, among other things, on the modification of polyether alcohols with alkoxysilanes which carry, for example, isocyanate groups, involving urethanizing linkage. Furthermore, methods of alkoxysilyl modification that are selected also include the hydrosilylating attachment of alkoxymonohydridosilanes to polyetherols that have been modified beforehand with olefinically unsaturated end groups.

The specifications JP 09012863, JP 09012861 and JP 07062222 claim a process for the preparation of polyetherols equipped exclusively terminally with hydrolysable trialkoxysilyl functions, examples being glycerol polyetherols, which are first prepared via DMC catalysis, then converted by addition of alkali metal alkoxide and allyl chloride into the corresponding allyl ethers, and subsequently reacted by means of platinum-metal-catalysed hydrosilylation to give the alkoxysilyl-terminated target products.

All of the processes described in the prior art, therefore, are suitable only for the preparation of polyoxyalkylene compounds that are modified exclusively terminally with trialkoxysilyl groups, and are not suitable at all for the single and/or multiple modification of polyether chains with trialkoxy functions within the sequence of oxyalkylene units as well.

According to EP 2 093 244 (US 2010-0041910), it was possible for the first time to prepare alkoxylation products which carry alkoxysilyl groups and which are distinguished by the fact that, in contrast to the state of the art known up until that point, the alkoxysilyl groups are distributed randomly or in blocklike fashion along the polyether chain, and are not located only at the termini of the chain. Moreover, these compounds are distinguished by an OH group which is terminal as a consequence of reaction.

The presence of the OH group and the hydrolysis-sensitive alkoxysilyl groups in a molecule form the basis for the intrinsic reactivity of the compounds and easy crosslinkability with formation of three-dimensional polymeric networks. However, experiments have also shown that the reactivity of the OH group may be too high. The formulations prepared from these compounds have an inadequate storage life. Even at slightly elevated temperature (up to 60° C.), they crosslink within a few days in the presence of the metal and/or amine catalysts that are typically used in moisture-curing formulations.

Although residual moisture in the formulation appears to be beneficial for crosslinking, it has been shown that, even under very dry conditions, incipient crosslinking of the formulation takes place within a few days in an accelerated storage test.

It is an object of the present invention, therefore, to lower the reactivity of the OH group of hydroxyl-terminated alkoxylation products which carry not exclusively terminal alkoxysilyl groups.

Surprisingly it has been possible to show that, through the reduction in the reactivity of the OH groups, the storage life and, surprisingly, the elongation at break, as well, of the cured/polymerized alkoxysilylated alkoxylation product can be massively improved. The products of the invention are also advantageously free of odor, e.g. free of ammonia odor.

The object is achieved through the introduction of endcapping on the hydroxyl group at the chain end of the prepolymer. These structures thus modified may be present alone or in a blend with unmodified structures, or may be used together with further compounds that are curable in different ways.

The invention accordingly provides alkoxylation products of the general formula (I)

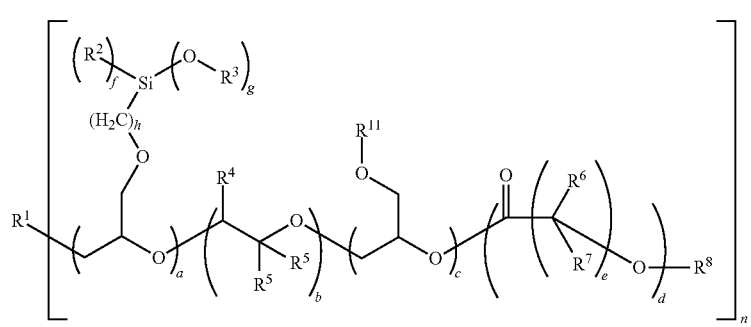

where
n=1 to 6, preferably 1 to 4 and more preferably 1 or 2 or 3,
$R^1$=a n-functional, saturated or unsaturated, linear or branched, organic radical of the type of an alkoxy, arylalkoxy or alkylarylalkoxy group, in which the carbon chain may be interrupted by oxygen atoms and which may also carry substituents comprising pendant alkoxysilyl groups or is substituted directly by alkoxysilyl groups, or corresponds to a polyoxyalkylene radical, a polyether radical, a polyetheralkoxy radical or a singly or multiply annulated phenolic group or may be derived from a singly or multiply hydroxylated or multiply substituted compound selected from the group of the alcohols, polyetherols, polyesterols, siloxanes, perfluorinated polyetherols, (poly)urethanes or sugars, preference being given to polyols, EO-polyetherols, PO-polyetherols or EO/PO-polyetherols, polyesterols, glycerol, polyglycerol, polyTHF, phenol, alkyl- and arylphenols, bisphenol A, novolaks, hydroxycarboxylic acids, siloxanols, siloxanediols, alkoxysilyl-group-modified polyetherols, castor oil, Ricinus oil, ricinoleic acid, sugar, lactones, cellulose, methanol, ethanol, n-, or isopropanol, n-, iso- or tert-butanol, 2-butanol, octanol, allyl alcohol, dodecanol, stearyl alcohol, 2-ethylhexanol, cyclohexanol, benzyl alcohol, ethylene glycol, propylene glycol, di-, tri- and polyethylene glycol, 1,2-propylene glycol, di- and polypropylene glycol, OH-functional polyolefins such as, OH-functional polybutadiene, 1,4-butanediol, 1,6-hexanediol, 1,4-butynediol, tetramethyldecynediol, trimethylolpropane, pentaerythritol, sorbitol, cellulose sugar, lignin or else further compounds which carry hydroxyl groups and are based on natural compounds, or other hydroxyl compounds which may also themselves carry alkoxysilyl groups or which carry substituents which are substituted by alkoxysilyl groups,
$R^2$=an alkyl group having 1 to 8 carbon atoms, more particularly methyl or ethyl,
$R^3$=an alkyl group having 1 to 8 carbon atoms, more particularly methyl, ethyl, propyl, isopropyl,
$R^4$=a hydrogen radical or an alkyl group having 1 to 8 carbon atoms, preferably methyl or ethyl,
$R^5$=independently at each occurrence a hydrogen radical, an alkyl group having 1 to 20 carbon atoms, or an aryl or alkaryl group, preferably hydrogen, methyl, ethyl, octyl, decyl, dodecyl, phenyl, benzyl, more preferably hydrogen, methyl or ethyl,
$R^{11}$=a saturated or unsaturated alkyl group having 1 to 8 carbon atoms whose chain may be interrupted by oxygen and may further carry functional groups such as carboxyl groups or ester groups, or an aryl group having 6 to 20 carbon atoms, or an alkaryl group having 7 to 20 carbon atoms, preferably a methyl, ethyl, phenyl or benzyl group or an allyl group or a polyacrylic ester,
$R^6$ and $R^7$=independently at each occurrence the same as $R^5$,
$R^8$=an endgroup of the formula IIa, formula IIb or formula IIc

formula IIa where
$R^9$=independently at each occurrence a linear or branched, saturated or unsaturated, optionally further-substituted alkyl group having 1 to 30 carbon atoms, or an aryl or alkaryl group, preferably methyl, ethyl, octyl, decyl, dodecyl, phenyl, benzyl, more preferably methyl or ethyl, formula IIb:

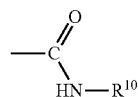

where
$R^{10}$=independently at each occurrence a linear or branched, saturated or unsaturated, optionally further-substituted alkyl group having 1 to 30 carbon atoms, or an aryl or alkaryl group, preferably methyl, ethyl, propyl-, isopropyl-, butyl-, isobutyl, octyl, decyl, dodecyl, phenyl, toluoyl, benzyl, isopropylphenyl or stearyl group more preferably methyl, ethyl, propyl, isopropyl, butyl, phenyl, tolyl, isopropylphenyl, or stearyl group, or a group -A(T)$_x$, where A=hydrocarbon residue, preferably comprising 2 to 16 carbon atoms, which might be substituted by halogen atoms, x=1 to 4, preferably 1 or 2, more preferably 1, and T independently at each occurrence —N=C=O, —NH—C(O)—X, where X=O—$R^{12}$ or NH—$R^{12}$, where $R^{12}$ independently at each occurrence hydrocarbon residue, that might be interrupted by hetero atoms, preferably a saturated or unsaturated, more preferably saturated hydrocarbon residue, comprising no hetero atoms, the hydro carbon residue preferably comprising from 1 to 30, more preferably from 2 to 18 and most preferably from 3 to 10 carbon atoms, and most preferably being a methyl, ethyl, propyl, or butyl residue, or X being a polyether radical, preferably having a molecular weight between 49 to 1999 g/mol, more preferably between 99 and 1199 g/mol and most preferably a butanol started propylene oxide polyether residue having a molecular weight of from 300 to 500 g/mol, or X a radical of formula Ia

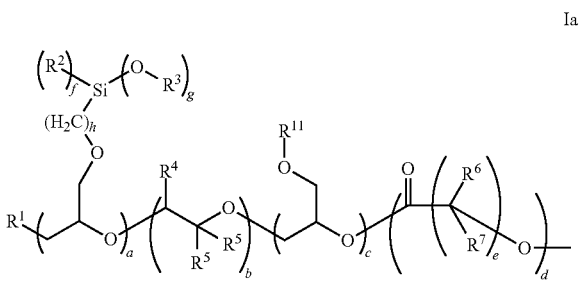

where the meaning of $R^1$ to $R^7$, $R^{11}$ and a to h are as defined for formula I, wherein X is preferably not a radical according to formula Ia, formula IIc:

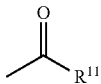

where $R^{11}$ may be a methyl, ethyl, propyl or isopropyl radical, or phenyl radical, or is a divalent, linear or cyclic, saturated or unsaturated alkylene group or at least doubly substituted aryl group which may carry at least one further carboxylic acid function, preference being given to acetate radical, propionate radical, phthalic acid radical, hexahydrophthalic acid radical or maleic acid radical,
a=0 to 1000, preferably 0 to 50 and more preferably 0 to 10, with the proviso that a must be greater than or equal to 1 if $R^1$ carries no substituents with alkoxysilyl groups or is itself not directly substituted by alkoxysilyl groups,
b=0 to 1000, preferably 1 to 800, more preferably 30 to 500 and more particularly 80 to 300,
c=independently at each occurrence the same as b,
d=independently at each occurrence the same as b,
with the proviso that that the groups having the indices a, b, c and d are freely interchangeable over the molecular chain and may be present singly or multiply and may occur distributed blocklike one after another or randomly over the molecular chain,
e=1 to 10, preferably 1 to 5,
g+f=3 and g is at least equal to 1,
h=0, 1, 2, 3, 4, 5, 6, 7, 8, 9 or 10.

The alkoxylation product of the formula (I) preferably carries a trialkylsilyl endblock or a urethane endblock or an ester endblock which has originated from the reaction of the terminal alcohol function with the compounds comprising the radical $R^8$.

The average molar masses $M_w$ of the compounds of the formula (I) thus prepared are between 8000 to 40 000 g/mol, preferably between 10 000 and 20 000 g/mol. The compounds of the formula (I) are preferably liquid at room temperature.

The products of the formula (I) can be used alone or else together with alkoxylation products which do not have the endgroup functionalization of the invention. If mixtures are used, then, in compositions comprising both species, the mass-percentage ratio between the endgroup-modified compounds of the formula (I) and their unmodified precursors is between 100:0 and 10:90, preferably between 95:5 and 15:85 and more particularly between 80:20 and 30:70.

The various monomer units both of the fragments with the indices a, b, c and d and also of the possibly present polyoxyalkylene chain of the substituent $R^1$ may be of blockwise construction with one another or else may be subject to a random distribution and, moreover, may be interchanged freely with one another. The sequence of the monomer units in the resultant polymer is dependent solely on the metering sequence and on the reactivity of the parent molecules.

The indices reproduced in the formulae given herein, and the value ranges for the indices indicated, are therefore to be understood as the average values of the possible random distribution of the structures and/or mixtures thereof that are actually present. This also applies to structural formulae which as such are reproduced exactly per se, such as for formula (I), for example.

The invention further provides curable compositions of formulations as constituents of compositions which are curable with exposure to water or to moisture and which comprise at least one of the products of the invention alone or in mixtures with further, possibly identical curable substances.

The formulations may be present in the form of a solution, emulsion, dispersion or else suspension. In aqueous emulsions or suspensions, for example, there may also be partial hydrolysates and thus incipiently crosslinked, partially polymerized species derived from the compounds of the formula (I). These partial hydrolysates in suspension or emulsion are suitable more particularly for the water repellency treatment of flat substrates, such as in architectural preservation, for example.

In this context it is also possible to employ the products described in EP 2 093 244 in any desired mixtures with the structures presented here, the proportion of the present inventive structures in such mixtures being advantageously at least 30% by weight, preferably 50% by weight. The formulations that are obtainable in this way may further comprise diluents, catalysts, plasticizers, fillers, solvents, adhesion promoters, additives for modifying the flow behaviour, referred to as rheological additives, additives for chemical drying, and/or stabilizers against thermal and/or chemical exposures and/or exposures caused by ultraviolet and visible light, thixotropic agents, flame retardants, blowing agents or defoamers, deaerating agents, film-forming polymers, antimicrobial and preservative compounds, antioxidants, dyes, colorants and pigments, antifreeze agents, fungicides, reactive diluents, complexing agents, wetting agents, co-crosslinkers, spraying aids, vitamins, growth substances, hormones, active pharmacological ingredients, fragrances, free-radical scavengers and/or other adjuvants.

EP 2 093 244 describes the possibility of advantageous selective alkoxylation of alkoxysilanes carrying epoxide functions in the presence of known double metal cyanide catalysts. With the process claimed therein, the possibility is opened up of carrying out reproducible, single and/or multiple, alkoxysilyl group modification of polyoxyalkylene compounds not only terminally but also within the sequence of oxyalkylene units. The disclosure of EP 2 093 244 is considered in its entirety to form part of the present description.

A disadvantage of alkoxysilylated products described therein, however, is their poor storage life when used in certain formulated systems.

The structures described here with the formula (I) solve at least the problem of the partly deficient storage life.

The products of the invention are obtainable preferably via an alkoxylation process using double metal cyanide (DMC) catalysts. The preparation of these catalysts and their use as alkoxylation catalysts have been known since the 1960s and they are presented in, for example, U.S. Pat. No. 3,427,256, U.S. Pat. No. 3,427,334, U.S. Pat. No. 3,427,335, U.S. Pat. No. 3,278,457, U.S. Pat. No. 3,278,458 or U.S. Pat. No. 3,278,459. The ever more effective types of DMC catalysts that were developed further in the subsequent years and are described in U.S. Pat. No. 5,470,813 and U.S. Pat. No. 5,482,908, for example, include zinc-cobalt hexacyano complexes in particular. By virtue of their extremely high activity, only small concentrations of catalyst are required for the preparation of polyetherols, and so it is possible to do without the workup stage at the end of the alkoxylation procedure that is needed with conventional alkaline catalysts, and that consists of neutralization, precipitation and the isolation of the catalyst by filtration. As a result of the high selectivity of DMC-catalysed alkoxylation, propylene oxide-based polyethers, for example, include only very small fractions of unsaturated by-products.

As reference material, mention may additionally be made, for example, of EP-A1-1 017 738 (U.S. Pat. No. 6,077,978), U.S. Pat. No. 5,777,177, EP-A1-0 981 407 (U.S. Pat. No. 5,844,070), WO 2006/002807 (US 2007-225394) and EP-A1-1 474 464 (US 2005-159627)

The invention therefore further provides a process for preparing alkoxylation products according to the formula (I) with DMC catalysis from starter compounds R1H which carry hydroxyl groups (R1 already contains the oxygen of the OH group) by performing an alkoxylation reaction of alkylene oxides and epoxy-functional alkoxysilanes, and, optionally, glycidyl compounds and/or lactones, in any order to produce addition products, and reacting the addition products with monosilanol-forming compounds, cyclic or linear carboxylic anhydrides, acids or isocyanates.

Monosilanol-forming compounds are those compounds which carry exactly one silanol group or are capable of forming such a group by reaction with moisture. Examples of compounds which carry silanol groups include the following structures $(CH_3)_3SiOH$, $(CH_3CH_2)_3SiOH$, $(CH_3CH_2CH_2)_3SiOH$, $(C_6H_{10})_3SiOH$, $(C_6H_{10})_2CH_3SiOH$, $R_3Si—O—SiR_2—OH$ (where R may be a hydrocarbon, but may also be a siloxane), $(C_6H_{10})(CH_3CH_2)_2SiOH$, $(C_6H_{10})_2CH_3CH_2SiOH$.

Preferred compounds are those of the type $R_3Si—OH$, in which R is a methyl, ethyl, propyl, vinyl or phenyl group, the methyl group being particularly preferred. Likewise possible for use are all chlorosilanes and chlorosiloxanes that react with OH groups, such as $(CH_3)_3SiCl$, for example.

Examples of compounds which are capable of forming silanol-carrying compounds with moisture are (N,N-dimethylamino)triethylsilane, (N,N-dimethylamino)-trimethylsilane, N,O-bis(trimethylsilyl)acetamide, N,O-bis(triethylsilyl)acetamide, N-(trimethylethylsilyl)acetamide, bistrimethylsilylurea, hexamethyldisilazane, 1,1,3,3-tetramethyldisilazane, trimethylsilyl phenoxide, trimethylsilyl alkoxide (where the alcohol comes from the group of C1-C10 alcohols) and dimethylsilyldiethylamine, the use of hexamethyldisilazane being particularly advantageous.

In addition it is possible to use compounds of the formula $R_3Si—O—X$, where X can stand for elements from the group of the halogens, but also for hydrocarbons which comprise an acidic hydrogen atom. These hydrocarbons with an acidic hydrogen atom may come from the group of the alcohols, preference being given to methanol, ethanol, propanol, butanol and isobutanol, or alternatively may be derived from carboxylic acids, such as, for example, formic acid, acetic acid, propionic acid, succinic acid, lauric acid, palmitic acid, stearic acid, acrylic acid, methacrylic acid, oleic acid, linoleic acid, oxalic acid, maleic acid, adipic acid, benzoic acid, phthalic acid, terephthalic acid, and also the anhydrides of these acids, since the acid may likewise be formed from these anhydrides by ingress of moisture. Furthermore, R may be composed of primary or secondary amines. Examples that may be mentioned here include ammonia, methylamine, dimethylamine, ethylamine, diethylamine, propylamine, dipropylamine, butylamine and phenylamine. Further possibilities are acid amides and ketones.

When the particularly preferred hexamethyldisilazane is used, but also when many other silanol-forming compounds are used, it is advantageous to add to the reaction mixture an organic acid from the group of the carboxylic acids, since this significantly increases the yield of the reaction. Examples that may be mentioned here include the following; formic acid, acetic acid, propionic acid, succinic acid, lauric acid, palmitic acid, stearic acid, acrylic acid, methacrylic acid, oleic acid, linoleic acid, oxalic acid, maleic acid, adipic acid, benzoic acid, phthalic acid, terephthalic acid, with acetic acid, propionic acid, maleic acid and oleic acid being preferred. Where HMDS is used together with the carboxylic acid that is catalytically active here, there is no competition reaction of the carboxylic acid with the HMDS for the OH function to be capped. The acids here react preferably with the nitrogen of the HMDS. Particularly preferred is oleic acid, since it is of low volatility under the reaction conditions, causes virtually no instances of discoloration, and has no unpleasant odour. Additionally or alternatively the reaction can also be catalysed through the use of a nitrogen base such as triethylamine, pyridine, aminopyridine or imidazole.

The cyclic or linear carboxylic acids or their anhydrides for use in accordance with the invention may be selected from the group encompassing acetic acid, propionic acid, o-phthalic acid, m-phthalic acid, p-phthalic acid, succinic acid, maleic acid, hexahydrophthalic acid or their corresponding anhydrides, preference being given to acetic acid, propionic acid, phthalic acid or maleic acid or their anhydrides, and particular preference going to the anhydrides of the stated carboxylic acids. The reaction with the alkoxylation product takes place preferably at temperatures of 80-150° C., more preferably at 100-130° C.

The isocyanates for use in accordance with the invention may be selected more particularly from the group encompassing methyl, ethyl, n-propyl, isopropyl, n-butyl, isobutyl, pentyl, hexyl, heptyl, octyl, nonyl, decyl, dodecyl, hexadecyl, octadecyl, phenyl, benzyl, m-isopropylphenyl, p-isopropylphenyl, cyclopentyl, m-tolyl, p-tolyl, pyridyl, naphthyl, acetylphenyl, cyanophenyl, nitrophenyl, dinitrophenyl, bisphenyl, methylnitrophenyl, stearyl, dimethylphenyl, trimethylphenyl, cyclohexyl, cyanophenyl, phenoxyphenyl and benzylphenyl isocyanate, preference being given to isopropyl, n-butyl, isobutyl, pentyl, hexyl, heptyl, octyl, nonyl, isopropylphenyl, tolyl, nitrophenyl, stearyl, dinitrophenyl or cyclohexyl isocyanate.

For the reaction of the alkoxylation product with isocyanates it may be necessary to accelerate the reaction by catalysis. Catalysts that have been used are the tin, bismuth and titanium catalysts well known to the skilled person from urethane chemistry, such as dibutyltin laurate, dioctyltin diketonate, dibutyltin dilaurate, dioctyltin dilaurate, dibutyltin diacetylacetonate, dibutyltin diacetate, dibutyltin dioctoate or dioctyltin diacetylacetonate, Borchi® catalysts, bismuth oxides, bismuth carboxylate, bismuth methanesulphonate, bismuth nitrate, bismuth chloride, triphenylbismuth, bismuth sulphide, and also preparations with these catalysts, titanates, e.g. titanium(IV) isopropoxide, iron (III) compounds, e.g. iron(III) acetylacetonate, aluminium compounds, such as aluminium triisopropoxide, aluminium tri-sec-butoxide and other alkoxides, and also aluminium acetylacetonate. Also suitable, furthermore, are zinc salts, such as zinc octoate, zinc acetylacetonate and zinc 2-ethylcaproate, or tetraalkylammonium compounds, such as N,N,N-trimethyl-N-2-hydroxypropylammonium hydroxide, N,N,N-trimethyl-N-2-hydroxypropylammonium 2-ethylhexanoate or choline 2-ethylhexanoate. Preference is given to the use of zinc octoate (zinc 2-ethylhexanoate), bismuth oxides, bismuth carboxylate, bismuth catalyst preparations and the tetraalkylammonium compounds, more preferably to that of zinc octoate, bismuth carboxylate, and also preparations with bismuth catalysts.

Possible in addition to the abovementioned monoisocyanates is the use of di- or triisocyanates. The reaction of the alkoxylation product having terminal OH groups with di- or tri-functional isocyanates leads in general to a massive increase in molar mass via the isocyanate. This effect is particularly pronounced if the starter R1 possesses a functionality>1 (formula I). This may lead to an end product with a viscosity which can no longer be managed. In order to avoid this event, the isocyanates that are not required for the actual endcapping are reacted with monofunctional alcohols or monofunctional amines. This controls the increase in molar mass. In practice this means that for each equivalent of difunctional isocyanate there are 0.75-1.25 equivalents of monofunctional alcohol or monofunctional amine metered in; in the case of a trifunctional isocyanate, 1.5-2.5 equivalents of monofunctional alcohol or monofunctional amine are metered in.

Use may be made of difunctional isocyanates selected from the group encompassing, for example, the following; toluene 2,4-diisocyanate (TDI), diphenylmethane diisocyanate or methylenediphenyl diisocyanate (MDI), hexamethylene diisocyanate (HMDI), polymeric diphenylmethane diisocyanate (PMDI), isophorone diisocyanate (IPDI), 4,4'-diisocyanatodicyclohexylmethane (H12MDI), the aliphatic products being preferred, and isophorone diisocyanate (IPDI) being particularly preferred. Trifunctional isocyanates which can be used are selected from the group encompassing, for example, the following; triphenylmethane triisocyanate, 1,3,5-benzene triisocyanate and 2,4,6-toluene triisocyanate.

Any monofunctional alcohol is suitable in principle for the reaction of the excess isocyanate functions, but on account of practical considerations particular suitability is possessed by alcohols which have a low molar weight but still do not have too high a vapour pressure. Preference is given to $C_3$, $C_4$, $C_5$, $C_6$, $C_7$, $C_8$, $C_9$ and $C_{10}$ alcohols such as, for example, 1-propanol, 2-propanol, 1-butanol, 2-methyl-1-propanol, 1-pentanol, 2-pentanol, 3-pentanol, 2-methyl-1-butanol, 1-hexanol, 2-hexanol, 3-hexanol, 2-methyl-1-pentanol, 3-methyl-1-pentanol, 4-methyl-1-pentanol, 3-methyl-2-pentanol, 4-methyl-2-pentanol, 2-methyl-3-pentanol, 2,2-dimethyl-1-butanol, 2,3-dimethyl-1-butanol, 3,3-dimethyl-2-butanol, 2-ethyl-1-butanol, 1-heptanol, 2-heptanol, 3-heptanol, 4-heptanol, 1-octanol, 2-octanol, 3-octanol, 4-octanol, 1-nonanol, 2-nonanol, 3-nonanol, 4-nonanol, 5-nonanol and 1-decanol, and also other monofunctional alcohols which can be mixed well in the alkoxylation product, such as, for instance, mono-OH-functional polyethers having a molar mass of between 50 g/mol and 1200 g/mol. Particularly preferred are 1-butanol, 2-methyl-1-propanol, 1-pentanol, 2-methyl-1-butanol, 1-hexanol, 2-methyl-1-pentanol, 3-methyl-1-pentanol, 4-methyl-1-pentanol, 2,2-dimethyl-1-butanol, 2,3-dimethyl-1-butanol, 2-ethyl-1-butanol, 1-heptanol, 1-octanol, 1-nonanol, 1-decanol, cyclohexanol, phenol, and benzyl alcohol, and also mono-OH-functional polyethers having a molar mass of between 100 g/mol and 850 g/mol. It is of course also possible to use a mixture of 2 or more of the stated alcohols. For the reaction, suitability extends in principle to all monofunctional amines which are liquid under the selected reaction conditions, such as, for example, all primary amines having a substituent which carries at least one C4 radical. It is preferred to use 1-butanamine, 1-pentanamine, 1-hexanamine, 1-heptanamine, 1-octanamine, aniline, cyclohexylamine or benzylamine. Of course, a mixture of 2 or more amines may also be used. Furthermore, a mixture of one or more amines and one or more alcohols may also be used for the reaction with the isocyanates.

For the reaction of the alkoxylation product with di-functional or tri-functional isocyanates it may be necessary to accelerate the reaction by catalysis. Catalysts that have been used are the tin, bismuth and titanium catalysts well known to the skilled person from urethane chemistry, such as dibutyltin laurate, dioctyltin diketonate, dibutyltin dilaurate, dioctyltin dilaurate, dibutyltin diacetylacetonate, dibutyltin diacetate, dibutyltin dioctoate or dioctyltin diacetylacetonate, Borchi® catalysts, bismuth compounds, such as, for example, bismuth oxide, bismuth carboxylate, bismuth methanesulphonate, bismuth nitrate, bismuth chloride, triphenylbismuth, bismuth sulphide, and also preparations with these catalysts, titanates, e.g. titanium(IV) isopropoxide, iron(III) compounds, e.g. iron(III) acetylacetonate, aluminium compounds, such as aluminium triisopropoxide, aluminium tri-sec-butoxide and other alkoxides, and also aluminium acetylacetonate. Also suitable, furthermore, are zinc salts, such as zinc octoate, zinc acetylacetonate and zinc 2-ethylcaproate, or tetraalkylammonium compounds, such as N,N,N-trimethyl-N-2-hydroxypropylammonium hydroxide, N,N,N-trimethyl-N-2-hydroxypropylammonium 2-ethylhexanoate or choline 2-ethylhexanoate. Preference is given to the use of zinc octoate (zinc 2-ethylhexanoate) or of the tetraalkylammonium compounds or bismuth compounds, such as, for example, bismuth oxide, bismuth carboxylate, bismuth nitrate, and also preparations with these catalysts, more preferably those of zinc octoate and bismuth carboxylates and their bismuth catalyst preparations.

The OH-terminated alkoxylation product, the isocyanate, the catalyst and, depending on the choice of the isocyanate, the monool or amine are combined and are reacted with one another at 40° C. to 120° C., preferably at 50° C. to 100° C. and, with particular preference, at 60° C. to 90° C. The sequence of the additions and component reactions may vary here. In the preferred embodiment for the reaction with a di-functional isocyanate, the diisocyanate and 0.75 to 1.25 mol of monool or amine per mole of isocyanate are reacted together with the catalyst at a temperature of 40° C. to 120° C., preferably at 50° C. to 100° C. and more particularly at 70° C. to 90° C. The resultant product is rapidly mixed, with stirring, with the alkoxylation product, in a ratio of 0.75-1.25 mol of reaction product per mole of hydroxyl groups in the alkoxylation product. Other sequences are likewise possible. Thus, for example, the alkoxylation product may likewise be reacted directly with a di-functional or tri-functional isocyanate. In this case the proportions are to be selected such that 0.75 to 1.25 mol of the isocyanate are used per mole of hydroxyl functions in the alkoxylation product. After the mixing of isocyanate and alkoxylation product, the catalyst is added at a temperature of 40° C. to 120° C., preferably at 50°

C. to 100° C. and more particularly at 70° C. to 90° C. The monool or the amine is subsequently added for reaction of the remaining isocyanate functions.

Depending on the epoxide-functional alkoxysilane used and any other monomers possibly employed, it is possible to prepare modified alkoxylation products (I), and also mixtures of any desired construction.

A non-exhaustive compilation of alkoxysilanes substituted by epoxide groups, that may be used alone or in mixtures with one another or in combination with epoxide compounds in the context of the invention, encompasses, for example, 3-glycidyloxypropyltrimethoxysilane, 3-glycidyloxypropyltriethoxysilane, 3-glycidyloxypropyltripropoxysilane, 3-glycidyloxypropyltriisopropoxysilane, bis(3-glycidyloxypropyl)dimethoxysilan, bis(3-glycidyloxypropyl)diethoxysilane, 3-glycidyloxyhexyltrimethoxysilane, 3-glycidyloxyhexyltriethoxysilane, 3-glycidyloxypropylmethyldimethoxysilane and 3-glycidyloxypropylethyldiethoxysilane.

The compounds which supply the radical $R^1$ of the formula (I) are understood in the context of the present invention to be substances which form the beginning (start) of the alkoxylation product to be prepared, this product being obtained through the inventive addition reaction of epoxide-functional monomers and possibly further comonomers. The starter compound used in the process of the invention is preferably selected from the group of the alcohols, polyetherols or phenols. As starter compound it is preferred to use a monohydric or polyhydric polyether alcohol or alcohol $R^1$—H (the H belongs to the OH group of the alcohol or phenol).

OH-functional starter compounds $R^1$—H used are preferably compounds having molar masses of 31 to 10 000 g/mol, more particularly 50 to 2000 g/mol, and having 1 to 6, preferably having 1 to 4, hydroxyl groups. The starter compounds may be used in any desired mixture with one another or as pure substance. It is also possible to use hydroxyl compounds substituted pendantly with substituents containing alkoxysilyl groups, or directly with alkoxysilyl groups, such as the silyl polyethers described in EP 2093244, as starter compounds.

Use is made advantageously of low-molar-mass polyetherols having 1-6 hydroxyl groups and molar masses of 50 to 2000 g/mol, which have in turn been prepared beforehand by DMC-catalysed alkoxylation, as starter compounds.

In addition to compounds with aliphatic and cycloaliphatic OH groups, suitability is possessed by any desired compounds having 1-20 phenolic OH functions. These include, for example, phenol, alkyl- and arylphenols, bisphenol A and novolaks.

The process of the invention provides modified alkoxylation products which are distinguished in that, in terms of structural composition and molar mass, they can be prepared specifically and reproducibly, are stable on storage and can be processed outstandingly under the influence of moisture to form an adhesive and/or sealing material which preferably has elastic qualities. The fragments inserted into the resultant modified polymer chain as a result of the alkoxylation reaction, with ring-opening of the reaction components, the starter, an organic hydroxyl compound, and different epoxides, which can be used in mixture and of which at least one carries a certain fraction of alkoxysilyl groups, are freely interchangeable with one another in terms of their sequence.

The process introduced here in accordance with the invention has opened up for the first time a process for the preparation of commercially useful adhesives and sealants from alkoxylation products which carry alkoxysilyl groups not exclusively terminally and which may optionally also be utilized for coatings or for the surface treatment of sheetlike or particulate substrates and objects.

Thus the process of the invention allows the construction of innovative prepolymer systems which could not have been derived in this way from the prior art and whose crosslinking leads to polymers which thus likewise reflect an innovative construction. A simple insertion of an alkoxysilyl-free polymer fragment between the chain functionalizations and/or termini functionalizations that are obtained in accordance with the invention and between an otherwise unspecified, very familiar polymer radical is therefore unable in any case to result in the prepolymers that are subject matter of the invention.

The compositions and mixtures of the invention that are curable under the influence of moisture and comprise preferably at least one component of the formula (I) may be used, for example, as adhesives and/or sealants for the coating and modification of sheetlike, particulate, fibrous substrate surfaces or fabrics. The coating may be, for example, a coating adhesive, and possibly also a foamed coating of adhesive. The curable composition may also be used in the form of an emulsion, dispersion, suspension or solution, preferably as an aqueous emulsion. This aqueous emulsion may comprise partly hydrolysed, partially crosslinked oligomeric or polymeric derivatives of the hydrolysis reaction or curing reaction of the compounds of the formula (I).

The invention accordingly further provides for the use of the products of the formula (I) of the invention in compositions as a constituent of formulations as adhesives or sealants or for the coating of substrates.

On account of their hydrolysis-sensitive alkoxysilyl groups which have a tendency toward crosslinking, these innovative, reactive modified alkoxylation products of the invention constitute curable modified polymers or oligomers. Crosslinking to form solid thermoset end products, or else, depending on the choice of the crosslinking density or of particular adjuvants, to form solid elastomeric or thermoplastic end products, takes place in a simple way in the presence of water and optionally with addition of acid or base as accelerator. Through variation, as for example increasing the temperature during the curing operation, it is possible to control—shorten, for example—the pot life. Thus, for example, through a variation in the fraction of alkoxysilane units in the modified polymer chain, it is possible to influence the crosslinking density and hence the profile of mechanical properties and of physicochemical properties of the cured modified polymers within wide limits.

This curable composition is composed of the alkoxylation product of the formula (I), prepared in accordance with the procedure referred to above, and of further additives selected from the group consisting of plasticizers, fillers, solvents, emulsifiers, adhesion promoters, additives for adapting the flow behaviour, referred to as rheological additives, and at least one curing catalyst. As and when needed, moreover, it is possible to incorporate additives for chemical drying, and/or stabilizers against thermal and/or chemical exposures and/or exposures caused by ultraviolet and visible light, into the formulation.

The compositions may, furthermore, also comprise functional substances that are known per se, such as rheological additives, water scavengers, thixotropic agents, flame retardants, blowing agents or defoamers, deaerating agents, film-forming polymers, antimicrobial and preservative compounds, antioxidants, dyes, colorants and pigments, antifreeze agents, fungicides, adhesion promoters and/or reactive diluents, and also plasticizers and complexing agents, spraying aids, wetting agents, vitamins, growth substances, hormones, active pharmacological ingredients, fragrances, light stabilizers, free-radical scavengers, UV absorbers and/or further stabilizers.

The alkoxylation products prepared by the process of the invention can be used alone or in a blend with an alkoxylation product prepared in accordance with EP 2 093 244, in which case the fraction of the alkoxylation product prepared by the process referred to in said specification ought to be >20% by weight, preferably >50% by weight and more preferably >75% by weight.

The plasticizers are selected from the group of the phthalates, polyesters, alkylsulphonic esters of phenol, cyclohexanedicarboxylic esters or else of polyethers, their proportion in the formulation being able to be 0% to 90% by weight, preferably 2% to 70% by weight, more preferably 5% to 35% by weight. Fillers which can be used include precipitated or ground chalk, precipitated or ground silicates, precipitated or fumed silicas, glass powders, glass beads, hollow glass beads (known as bubbles), metal oxides, such as $TiO_2$, $Al_2O_3$, for example, metal hydroxides, such as aluminium hydroxide, for example, wood flour, natural or precipitated barium sulphates, reinforcing fibres, such as glass fibres or carbon fibres, for example, long or short fibre wollastonites, cork, carbon black or graphite. The fillers are used preferably at a concentration of 0% to 90% by weight, based on the completed mixture, with concentrations from 5% to 70% by weight being particularly preferred. It is further advantageous to use fillers which have been rendered water repellent, since these products exhibit lower water absorption and improve the storage life of the formulations. Many of the stated fillers can be rendered water repellent subsequently, or can be produced in water repellent form as a result of a skilful operational regime, or may even be rendered water repellent by the alkoxylation products of the invention. The methods of imparting water repellency are diverse and are known to the skilled person.

The mixtures may comprise organic substances, preferably liquids and solvents. The solvents in this case serve, for example, to lower the viscosity of the non-crosslinked mixtures, and promote attachment to the particle surface. Solvents contemplated include in principle all solvents and also solvent mixtures. Preferred examples of such solvents are ethers such as, for example, tert-butyl methyl ether, esters, such as, for example, ethyl acetate or butyl acetate or diethyl carbonate, and also alcohols, such as, for example, methanol, ethanol, and also the various regioisomers of propanol and of butanol, or else glycol types that are selected specifically in accordance with the application. Moreover, aromatic and/or aliphatic solvents, and also halogenated solvents, such as dichloromethane, chloroform, tetrachloromethane, hydrofluorocarbons (FREON), for example, and so on, may be employed, and so can inorganic solvents such as, for example, water, $CS_2$, supercritical $CO_2$, and so on.

The rheological additives may be obtained from the group of the amide waxes, such as from Cray Valley under the brand name Crayvallac®, hydrogenated vegetable oils and fats, fumed silicas, such as Aerosil® R202 or R805 (both of which can be purchased from Evonik) or Cab-O-Sil® TS 720 or TS 620 or TS 630 (sold by Cabot). Depending on the desired flow behaviour, these additives are used with a fraction of 0% to 10% by weight, preferably with a fraction of 2% to 5% by weight, based on the overall formulation. Chemical drying agents which can be used, alone or in a mixture, are vinyltrimethoxysilane (Dynasylan® VTMO, Evonik or Geniosil® XL 10, Wacker AG), vinyltriethoxysilane (Dynasylan® VTEO, Evonik or Geniosil® GF 56, Wacker), vinyltriacetoxysilane (Geniosil® GF 62, Wacker), N-trimethoxysilylmethyl O-methylcarbamate (Geniosil® XL 63, Wacker), N-dimethoxy(methyl)silylmethyl O-methylcarbamate, N-methyl[3-(trimethoxysilyl)propyl]carbamate (Geniosil® GF 60, Wacker), vinyldimethoxymethylsilane (Geniosil® XL 12, Wacker), vinyltris(2-methoxyethoxy)silane (Geniosil® GF 58, Wacker), bis(3-triethoxysilylpropyl)amine (Dynasylan® 1122, Evonik), bis(3-trimethoxysilylpropyl)amine (Dynasylan® 1124), N-dimethoxy(methyl)silylmethyl O-methylcarbamate (Geniosil® XL 65, Wacker) or oligomeric vinylsilanes such as, for example, Dynasylan® 6490 and Dynasylan® 6498 (both of which can be purchased from Evonik). The concentration for use is guided by the degree of stabilization and the efficacy of the drying agent, preferably with a fraction, based on the overall formulation, of 0% to 5% by weight, more preferably with a fraction of 0.2% to 3% by weight. Furthermore, in addition or alternatively to the chemical drying, it is possible to use a physical drying agent, such as, for example, zeolites, molecular sieves, anhydrous sodium sulphate or anhydrous magnesium sulphate. Adhesion promoters used, in each case alone or in a mixture, are the substances known to the skilled person, principally compounds which carry alkoxysilyl groups and which additionally possess primary or secondary amine groups, vinyl groups, thiol groups, aryl groups or alternatively oxirane groups, such as 3-aminopropyltrimethoxysilane (Dynasylan® AMMO (Evonik)), N-(2-aminoethyl)-3-aminopropyltrimethoxysilane (Dynasylan® DAMO (Evonik)), 3-mercaptopropyltrimethoxysilane (Dynasylan® MTMO, Evonik), 3-glycidyloxypropyltriethoxysilane (Dynasylan® GLYEO, Evonik), glycidyloxypropyltrimethoxysilane (Dynasylan® GLYMO, Evonik), phenyltrimethoxysilane (Dynasylan® 9165 or Dynasylan® 9265, Evonik) or oligomeric amino/alkyl-alkoxysilanes such as, for example, Dynasylan® 1146 (Evonik). As stabilizers it is possible to use the products or product combinations that are known to the skilled person and are composed of, for example, Tinuvin® stabilizers (Ciba), for example Tinuvin® 1130, Tinuvin® 292 or else Tinuvin® 400, advantageously also in combination. The amount in which they are used is guided by the degree of stabilization required. Additionally, co-crosslinkers may be added to the formulation for the purpose of increasing mechanical hardness and reducing the flow propensity. Co-crosslinkers of this kind are typically substances capable of providing 3, 4 or more crosslinkable groups. Examples in the context of this invention are 3-aminopropyltriethoxysilane, tetramethoxysilane or tetraethoxysilane.

The curable compositions thus obtained are extremely suitable for the bonding and/or sealing and/or foaming and/or coating of particulate or sheetlike substrates. Additionally provided by the invention, therefore, is the use of the compounds of the formula (I) of the invention and of the formulations comprising them for use in the construction industry or in vehicle construction, for the sealing and bonding of construction elements and components, and also for the coating of porous or non-porous, particulate or sheetlike substrates. The alkoxylation product described in this invention is outstandingly suitable, as a basis of a curable composition, for the coating and modification of surfaces, particles and fibres. On account of the underlying chemistry, preference is to be given in particular to those substrates which possess polar surfaces. By way of example, mention may be made here of applications on metals, especially the materials of construction such as iron, steel, stainless steel and cast iron, ceramic materials, based in particular on solid metal oxides or non-metal oxides or carbides, aluminium oxide, magnesium oxide or calcium oxide, and also mineral substrates or organic substrates, cork and/or wood. The composition may also be utilized for the bonding and levelling of uneven, porous or fragmentary substrates, such as mineral substrates, wood or cork chipboard and fibreboard, composite materials such as, for example, wood composites such as MDF board (medium-density fibreboard), WPC (Wood Plastic Composites) articles, chipboard, cork articles, laminated articles, ceramics, but also natural fibres and synthetic fibres.

As curing catalysts for the crosslinking or polymerization of the prepolymer mixtures of the invention or for their chemical fixing to particle surfaces or macroscopic surfaces, it is possible to use the known polyurethanization, allophanatization or biuretization catalysts which are known per se to the skilled person, and/or the catalysts that are known from the literature and are used conventionally for the hydrolysis and condensation of alkoxysilanes. These include compounds such as, for example, the typically used organic tin compounds, such as, for example, dibutyltin dilaurate, dioctyltin dilaurate, dibutyltin diacetylacetonate, dibutyltin diacetate, dibutyltin dioctoate or dioctyltin diacetylacetonate. It is also possible, furthermore, to use zinc salts, such as zinc octoate, zinc acetylacetonate and zinc 2-ethylcaproate, or tetraalkylammonium compounds, such as N,N,N-trimethyl-N-2-hydroxypropylammonium hydroxide, N,N,N-trimethyl-N-2-hydroxypropylammonium 2-ethylhexanoate or choline 2-ethylhexanoate. Preference is given to the use of zinc octoate (zinc 2-ethylhexanoate) and of the tetraalkylammonium compounds, more preferably to that of zinc octoate. Furthermore, it is also possible to use bismuth catalysts, e.g. Borchi® catalysts, titanates, e.g. titanium(IV) isopropoxide, iron(III) compounds, e.g. iron(III) acetylacetonate, aluminium compounds, such as aluminium triisopropoxide, aluminium tri-sec-butoxide and other alkoxides, and also aluminium acetylacetonate, calcium compounds, such as calcium disodium ethylene-diaminetetraacetate or calcium diacetylacetonate, or else amines, e.g. triethylamine, tributylamine, 1,4-diazabicyclo[2.2.2]octane, 1,8-diazabicyclo[5.4.0]undec-7-ene, 1,5-diazabicyclo[4.3.0]non-5-ene, N,N-bis(N,N-dimethyl-2-aminoethyl)methylamine, N,N-dimethylcyclohexylamine, N,N-dimethylphenylamine, N-ethylmorpholine, etc. Organic or inorganic Brønsted acids as well, such as acetic acid, trifluoroacetic acid, methanesulphonic acid, p-toluenesulphonic acid or benzoyl chloride, hydrochloric acid, phosphoric acid, the monoesters and/or diesters thereof, such as butyl phosphate, (iso)propyl phosphate, dibutyl phosphate, etc., for example are suitable as catalysts. It is of course also possible to use combinations of two or more catalysts.

The curable compositions of the invention may also comprise as catalysts what are called photolatent bases, of the kind described in WO 2005/100482. Photolatent bases are preferably organic bases having one or more basic nitrogen atoms which initially are present in a blocked form and which release the basic form only on cleavage of the molecule in response to irradiation with UV light, visible light or IR radiation. The content of the description and of the claims of WO 2005/100482 is hereby introduced as part of the present disclosure.

The catalyst or the photolatent base is used in amounts of 0.001% to 5.0% by weight, preferably 0.01% to 1.0% by weight and more preferably 0.05% to 0.9% by weight, based on the solids content of the process product. The catalyst or the photolatent base can be added in one portion or else in portions or else continuously. It is preferred to add the whole amount in one portion.

As further components it is possible for the mixtures preferably to comprise further, usually monomeric, silanes, hydroxyl-carrying siloxanes or solvents.

As further silanes it is possible here in principle to use all silanes, preferably those having hydrolysable alkoxy groups, and more particularly silanes which carry amine groups or vinyl groups, and also those described in DE 10 2006 054155 (US 2010-078117) or WO 2005/003201 (US 2007-167598).

Another inventive application of the compounds of the formula (I) carrying alkoxysilyl groups is in aqueous emulsions and dispersions. Emulsifiers contemplated for such emulsions include in principle all anionic, nonionic, cationic and amphoteric emulsifiers and also emulsifier mixtures. Preferred examples of such emulsifiers are alcohol ethoxylates, fatty acid ethoxylates, ethoxylated esters, and (ethoxylated) sorbitan esters. By means of adjuvants and additives, such as a water-insoluble plasticizer, for example, it is possible to modify the properties of the emulsion to its field of application. Depending on the composition of the curable mixture, there may be curing of the emulsified phase, more precisely the alkoxylation product, in aqueous emulsion. This is the case particularly when the curable composition is formulated such that in the presence of water it cures slowly and therefore time remains for the emulsifying of the alkoxylation product. These resultant dispersions and their application, as a basis, for example, of an adhesive or sealant, are expressly part of this specification.

In the context of increasing environmental awareness, however, the addition of organic solvents for the purpose of reducing the viscosity of surface-modifying formulations has in recent years come increasingly under fire. An alternative option is to apply the prepolymers of the invention in the form of an emulsion, advantageously an aqueous emulsion. Emulsions comprising silyl-functionalized prepolymers have been described in the literature. DE 2558653 (U.S. Pat. No. 3,941,733) describes emulsions of self-emulsifying polyurethanes which carry silyl groups, and the use thereof for the coating of surfaces. U.S. Pat. No. 4,376,149 describes emulsified mixtures of OH-siloxanes and polyethers with chain-end silylation, and the use thereof for the coating of textiles. DE 4215648 describes storage-stable contact adhesives based on solutions or emulsions of cationically modified, alkoxysilane-terminated polyurethanes. U.S. Pat. No. 6,713,558 and U.S. Pat. No. 6,831,128 described water-thinnable emulsions of silylated elastomers and their preparation, while WO 2007/

072189 (US 2008-275176) and WO 2008/090458 describe emulsions of polymers which carry silyl groups.

Aqueous emulsions, therefore, are a further application of the compounds of the formula (I) carrying alkoxysilyl groups.

The aqueous phase of the emulsions may comprise hydrophilic, inorganic fillers for modifying the mechanical properties of the coatings of the invention, with the proviso that these hydrophilic fillers are added subsequently to the emulsion which has already been stabilized. It can be advantageous for the surface of the fillers used to have at least one functional group, with the result, after drying or breaking of the emulsion, that there are chemical reactions between reactive functional groups in the alkoxylation product of the formula (I) with those on the filler surface. Examples of such fillers are fumed and precipitated silica, inorganic oxides such as aluminium oxide, titanium dioxide and zirconium dioxide, glass and quartz, hydroxides such as aluminium hydroxide and magnesium hydroxide, silicates such as wollastonite, mica, kaolin and talc, calcium carbonate and other carbonates, metals such as copper, zinc and nickel, and metal alloys, and also graphite and carbon black.

The emulsion may further comprise organofunctional, water-insoluble silanes of low molar mass, as described above. The emulsion may likewise comprise the above-described catalysts for the fixing of the alkoxylation product to a surface.

The invention further provides for the preparation of flame-retardant thermoplastic polymer compounds or thermoset moulding compositions comprising the alkoxylation products of the formula (I), and possibly further comprising flame prevention and/or flame retardant substances such as, for example, ATH (aluminium trihydrate=aluminium hydroxide=aluminium trihydroxide), MDH (magnesium dihydroxide), hydromagnesites or melamine cyanurate. Polymer compounds of this kind are used, for example, for producing cable insulation materials based on polypropylene, polyethylene or ethylene-vinyl acetate for cable and cable sheathing, or, on the basis of polypropylene, for example, flame-retardant partitions are produced, which are subject to particularly exacting requirements in public buildings such as sports halls, for example.

The flame retardant compositions, compounds or else electrical cables thus furnished may exhibit improved mechanical stability, improved dispersing of further additives, good extrusion qualities even at high levels of filling with particulate additives (such as with talc, calcium carbonate, etc., for example) and also enhanced flame retardancy, or lower levels of smoke production on severe heating. Particularly in the case where alkoxylation products are used that contain siloxane groups, the silicon content may provide additional stability in the event of fire, since, after burning has taken place, a fraction of $SiO_2$ remains which has an additional stabilizing action and is fire-retardant. Moreover, even in the course of burning, at a relatively early point in time, a so-called skin is formed preferentially, which increases the further rise of the body temperature and thus inhibits the progress of the fire, a factor which is particularly relevant in the case, for example, of cables which lead from one room into the adjacent room.

Where these compositions of the invention are to be foamable, they comprise one or more blowing agents, which may be formed chemically.

The surfaces to be coated may be coated by known means such as spraying, brushing, dipping, etc. The surfaces to be bonded are preferably pressed against one another in the process. The application of the optionally foamable mixture for producing the adhesive bond is accomplished preferably from a pressurized canister, in which case the formation of foam takes place by virtue of the blowing agent which is present in the mixture and which may also be released by chemical reaction. The production and application of adhesive foams are described in more detail in the specification DE 10 2008 043218 (US 2010-071849).

Further provided by the invention, therefore, is a foamable curable composition comprising at least one compound of the formula (I) and at least one chemical or physical blowing agent, which is foamed to form a foam between the surfaces to be bonded, or else the foam which can be produced from the mixture, following foaming, is applied to one of the surfaces to be bonded or else between the surfaces to be bonded, and the foam is subsequently compressed between the surfaces to be bonded.

Suitable blowing agents are gases which can be condensed even at relatively low pressures and which are also used for the production of sprayable assembly foams. Examples of common blowing agents include hydrocarbons having in each case 1 to 5, more particularly 3 to 5, carbon atoms, especially propane-butane mixtures or isobutane, hydrofluorocarbons with 1-5 carbon atoms, e.g. 1,1,1,2-tetrafluoroethane or 1,1-difluoroethane, or dimethyl ether, and also corresponding mixtures. The blowing agent content is preferably <10% by weight, more preferably <7% or <5% by weight, based on the overall mixture.

The amount of the blowing agents, based on the overall mixture, is preferably not more than 10% by weight, more preferably not more than 7% by weight.

Foam formation may also take place without addition of a blowing agent on a purely chemical basis, but in that case preferably in the case of warm or hot curing. In this case, when the adhesive mixture is heated, a low-volatility blowing agent is formed which comprises, for example, alcohols such as methanol or ethanol which have formed from the hydrolysis of the alkoxysilyl group. At elevated temperature, water or an inert solvent may also serve as blowing agent.

Where the coating of a substrate is desired, then it is possible simply to do without the blowing agent, and to set the physical properties that are required for coatings in a targeted way through addition of solvents or further additives and auxiliaries, optionally. Subject matter of the present invention, therefore, is also a method for the coating or modification of surfaces, where a composition which comprises the alkoxylation product with at least one further aminosilane compound or vinylsilane compound is applied to the surface that is to be treated, and is cured.

Particle surfaces of solid or else porous particles can be surface-coated in accordance with the invention with methods that are known from the prior art. These include the nozzle application of the alkoxylation product to the particles with mixing, optionally with mixing, kneading and/or heating optionally in the presence of suitable crosslinking catalysts. The alkoxylation products of the invention may also be applied in pure form or from suitable organic and/or inorganic solvents to the particle surfaces, where they may then react with covalent attachment. It is also possible to apply emulsions of the alkoxylation products of the formula (I) of the invention in suitable media to the particle surfaces, optionally with addition of auxiliaries, further modifying agents, and emulsifiers and/or wetting agents. Also possible is the modification of particle surfaces in a matrix of (pre-)dispersed particles, such as, for example, of functional particles or particulate filler (pre-)dispersed in a polymer or a varnish, by addition of the alkoxylation product to the corresponding systems with mixing, optionally with heating and/or the addition of a suitable catalyst. In each case, further components as well may be admixed with the alkoxylation products, such as, for example, monomeric, oligomeric or polymeric silanes or other components which carry reactive silyl groups, and also materials which attach or cure by a different mechanism, such as, for example, acrylates, epoxides, isocyanates, carboxylates, hydroxides, lactones, lactams, and so on. It is also possible for two or more of the alkoxylation products to be used in a mixture with one another.

The particles to be modified, which are of different origin, different size and/or particle-size distribution, and of different morphology (spherical, platelet-shaped (with different aspect ratios), fibrous, fractally aggregated, cuboid or cuboidal, and so on), and in different states of agglomeration, include, for example, oxidic particles, such as fumed silica, examples being AEROSIL®s from EVONIK Degussa GmbH, precipitated silicas, examples being SIPERNAT®s from EVONIK Degussa GmbH, quartz particles and further inorganic oxide particles, such as glass particles, titanium dioxide, such as AEROXIDE® $TiO_2$ P25 and AEROXIDE® $TiO_2$ P90 from EVONIK Degussa GmbH, aluminium oxide, such as AEROXIDE® Alu C from EVONIK Degussa GmbH, for example, zirconium dioxide and/or cerium dioxide, iron oxides, copper oxides and so on, silicatic particles such as, for example, particles of kaolin, wollastonite, talc, mica, feldspars and so on, hydroxides such as aluminium trihydroxide and/or magnesium dihydroxide, boehmite, hydrotalcite and hydroxidic iron pigments, such as, for example, FeO(OH), carbonates, such as, for example, calcium carbonate and/or dolomite, metals such as iron, copper, zinc, nickel, aluminium, magnesium and so on, metal alloys and/or carbon-containing materials, such as, for example, graphite and/or carbon black and so on.

As organic particulate substrates it is possible to use particles of, for example, silicone resins, organomodified silicones, organic polymers and/or biopolymers, organic polyelectrolytes, melamine cyanurate, and so on.

The different particles may also be surface-modified in a mixture.

The ratio of particle mass to surface modifier is dependent on the available particle surface, the desired degree of modification and the molecular weight of the modifying agent. Relative to the mass of the particles to be modified, the modifying agent of the invention may be present in a mass ratio of particle mass:modifying agent mass in the range from 1:10 to 1 000 000:1, preferably from 1:1 to 10 000:1 and more preferably in the range from 2:1 to 1000:1.

Considering the particle weight in relation to the overall mixture that is used for surface modification, consisting of compositions comprising the alkoxylation product or products, optionally catalyst, solvents, further silane compounds, and other auxiliaries, the mass ratio of particle weight:modifying mixture may be in the range from 1:1000 to 100 000:1, preferably in the range from 1:100 to 1000:1, more preferably in the range from 2:1 to 1000:1.

Macroscopic surfaces may likewise be coated with the alkoxylation products in accordance with the methods known from the prior art. In this case the alkoxylation products may be used either in pure form or else in a blend with further components, examples being inorganic and/or organic solvents, reactive components such as monomeric, oligomeric or polymeric silanes, acrylates, epoxides, hydroxy compounds, amines and so on, and also further coating components or auxiliaries, for the purpose of the surface modification.

The application of the alkoxylation products here may take place in pure form, neat, in organic or inorganic solvents, as aqueous emulsions or in combination with modifying agents with different kinds of functionalization, such as, for example, epoxides, acrylates, amines, isocyanates, urethanes and/or other polymers, as mixtures of the alkoxylation products with monomeric silanes, such as, for example, aminosilanes and vinylsilanes and/or other polymers which carry silyl groups.

The modification of macroscopic surfaces with the materials described may be carried out, for example, with the techniques known from the prior art, such as dip coating, spray coating or spin coating, flooding, misting, brush application, rolling, printing, screen-printing, stamping and—where the formulas of the invention that are used for surface modification have an appropriate consistency—by powder coating techniques as well. It is also possible, furthermore, to use emulsions of the alkoxylation products in suitable organic and/or inorganic solvents, optionally with addition of further substances such as, for example, coating components, auxiliaries, such as, for example, wetting agents, emulsifiers and/or rheological additives, and also fillers and/or functional particles, for the purpose of modifying the surfaces.

This makes it possible to modify a very wide variety of different surfaces, consisting for example of metal oxides, mixed oxides, nitrides, hydroxides, carbides, carbonates, silicates, pigments, carbon blacks, elements or alloys and also surfaces of organic materials. Furthermore, of course, the surfaces of organic particles, such as those of silicone resins, organomodified silicones, organic polymers or biopolymers, are also amenable to surface modification.

Examples of such surfaces are macroscopic and microscopic surfaces such as surfaces of glass, varnishes, metals, semiconductor materials, oxidic materials such as stones, concretes or mortars, wood, organic and inorganic fibres, woven fabrics and particles, polymers, biopolymers and so on.

The alkoxylation products may serve for example as base materials for the production of adhesives, as reactive crosslinkers, as adhesion promoters and primers, and also binders, for metals, glass and glass fibres/glass fabric, wood, wood-based materials, natural fibres, for the furnishing and treatment of textile or non-textile sheetlike structures and fibres of natural and/or synthetic and also mineral raw materials, and also, for example, cork, leather, paper, tissue, and silicatic and oxidic materials.

The possibilities for application of mouldings, surfaces or particle surfaces modified in this way are diverse. For instance, particles treated in this way may be used, for example, as fillers for polymers or for the production of polymer compounds, nanocomposites and masterbatches. A good overview of functional fillers in polymers is offered by "Functional Fillers for Plastics", Edited by Prof. Dr. Marino Xanthos, WILEY-VCH Verlag GmbH & Co. KgaA, Weinheim, 2005, ISBN 3-527-31054-1. The use of the alkoxylation product of the invention may be such that, on the one hand, the particles for modification are modified in an operation beforehand and then dispersed in the polymer, though secondly it is also possible for the alkoxylation products to be added when the fillers are dispersed in the respective polymer, by way, for example, of a liquid feed to the extruder, with an effective dispersing section following. Surprisingly, in general, the modification of particle surfaces with the alkoxylation products of the formula (I) is accomplished successfully without caking or aggregation of the particulate materials to be modified, in spite of the polyfunctional character of the alkoxylation product of the formula (I). Furthermore, particles surface-modified in accordance with the invention may be used, for example, as fillers or functional additives in coating materials, polymer compounds, nanocomposites, masterbatches or liquid pastes, polymeric foams, organic resins or silicone resins, optionally with reactive attachment to the respective matrices, as melt flow index improvers in injection moulding applications, for obtaining physical effects on surfaces, such as superhydrophobicity, temperature-dependent wettability, beading effects, influencing the dirt pick-up behaviour and the soil release behaviour on solid surfaces on constructions, textiles or fibres, and also the adhesion of condensates and ice to surfaces and particles bearing the coatings of the invention, and as slip additives or lubricants, in sealing systems, for obtaining tactile effects, such as a silky hand (soft-touch surfaces) or a defined surface grip or roughness, as matting agents, as points of attachment for other materials, such as other coating materials, for example, as adsorbents or absorbents in, for example, paper materials or filter materials or fabrics, as self-dispersible particles for producing dispersions, as particulate emulsifiers (for what are called "Pickering emulsions" (see also "Emulsions", Spencer Umfreville Pickering, Journal of the Chemical Society, Transactions (1907), 91, 2001-2021)), as reactive and/or crosslinkable particles, optionally in dispersion in liquid media, as active components in defoamers, in architectural preservatives, for example as active components for integral hydrophobization of materials, as a structured hydrophobic component for surface hydrophobization or as a carrier for active liquid components, as (optionally reactive) encapsulants, such as, for example, for core-shell particles or for the microencapsulation of liquid systems, for the modification of membrane materials, as for example for obtaining a defined, adjustable porosity, selectivity or permeability, as antistatic additives, for example after hydrophilic or hygroscopic particle surface modification, as free-flow aids, as additives for obtaining or enhancing scratch resistance on the part of the surfaces or materials furnished with the particles, or as particulate additives with other functions, for example as microbicidal additives, as fluorescent labels or as effect pigments, as release agents, as constituents of cable coatings with low-temperature resistance, as manufacturing components of rubber parts and membranes, as a size or ingredients for sizes in the textile and glass fibre industries, for paper, as additives for toners, as abrasives or line fillers in cosmetics, as carrier materials or formulating ingredients which release auxiliaries or active ingredients over a prolonged period of time, in which case the substances which are to be released and which may be present in the particles are, for example, cosmetic oils and active ingredients, fragrances, active pharmaceutical ingredients, active antimicrobial ingredients, including, for example, silver and compounds containing silver, and also dyes and preservatives, and so on.

The alkoxylation products of the invention can be utilized alone or as additives in aqueous systems for treating the stated sheetlike structure and fibres, and thus allow the use of the mouldings, sheetlike structures and fibres thus furnished in the sectors of hygiene, medicine, construction, automotive engineering, home textiles, apparel textiles, sports and agriculture.

The particles or sheetlike structures surface-modified in this way therefore have new properties or optimized properties such as in respect, for example, of softness, lubricity, water transport/absorption, water/oil repellency, UV protection, self-cleaning (Lotus effect) for awnings, for example, flame retardancy, increase in strength in tandem with excellent flexibility, antistatic properties, and resistance to bacteria, viruses and chemicals.

The invention thus further provides the coated articles referred to above and produced using the compositions comprising the alkoxylation products of the invention, examples being mouldings, surfaces, particles, woven fabrics, other fabrics, and similar materials.

The invention further provides sealants and/or adhesives comprising the alkoxylation products of the invention, where a surface coating also is able to seal or to bond adhesively by itself, these sealants and/or adhesives possibly comprising, in particular, slip additives such as, for example, $MoS_2$ or PTFE particles.

The alkoxylation products of the invention may additionally be used in the production of electrical and/or electronic components such as, for example OLEDs and solar panels. As additives in this case there may be conductive particles or ionic liquids present, thus allowing the systems to be used in conductive coatings and conductive adhesives, as for example in conductor tracks, for contacting and/or antistatic treatment.

Additionally provided by the invention are composite materials such as, for example, wood-plastic composites (WPCs) produced using the compounds of the formula (I); WPCs are thermoplastically processable composite materials, which are composed of different proportions of wood, plastics and additives and which are processed by thermoplastic shaping techniques, such as, for example, extrusion, injection moulding or compression moulding technologies. As compared with polypropylene-maleic anhydride-grafted copolymers, the innovative silyl polyether composites exhibit enhanced attachment to the wood or fibre substructure of these materials. The alkoxylation products bind to the fibres based on wood, coconut or other naturally available fibre products and at the same time render this surface water repellent, thereby guaranteeing a reduced drying time of the wood fibre pellets (energy saving!). In contract to conventional inorganic fillers, even low molecular mass products here may develop a very good compatibilizing effect, since, in the case of rapid extrusion operations, they can be homogeneously dispersed much more rapidly, in seconds, than the PP-MAA polymers.

The invention further provides powder coating hardeners with defined glycidyl functionality and improved compatibility and/or adhesion (adhesion promotion) to the substrate, which also reduces sub-film corrosion creep in powder coating facade applications. The promotion of adhesion is of key significance in particular in the case of oxidic or silicatic surfaces such as mortar, screeding or cement, for example.

The invention further provides liquid pastes in which the alkoxylation products of the invention are used alone instead, for example, of a customary polyether polyol (PPG 1000), which generally necessitates the additional use of a dispersant, since the alkoxylation product of the formula (I) combines the properties of both materials. Pastes of this kind, which may comprise pigments as colorants or may further comprise dyes and other additives, are used for the colouring of polyol-based systems such as, for example, PU foams, thermoplastic urethanes or the like.

Further provided by the invention is the use of the alkoxylation product and formulations produced therefrom for the production, for example, of cosmetic products as well. Thus the products of the invention may be used in a formulation for the permanent or non-permanent treatment of skin, hair or epidermal derivatives, in order, for example, to achieve a particularly long-lasting, positive sensorial effect. In this context, particularly advantageous products are those which enter into interaction with organic substrates by virtue of particularly hydrophobic segments or by virtue of cationic monomers, and can therefore easily be deposited on such substrates. The alkoxysilyl function may ensure permanent attachment to the skin or hair surface by virtue of reactions with OH groups on these surfaces.

The alkoxylation products of the invention may also be used as additives in varnish or nail-varnish formulations.

A modern nail varnish or nail coating composition serves to provide an appealing form and colouring to fingernails and toenails. In addition, the nail is protected from environmental influences and the hardening of the nail bed or nail surface is ensured. Particular efforts are undertaken in order to provide nail varnish coatings which are long-lasting, insensitive to scratching and splitting, lustrous and in attractive colours and brilliance. Nail varnishes (therefore) contain a large number of very different ingredients, of which the particularly important ones are film formers, adhesion promoters, plasticizers, solvents and pigments. Fumed silica is used as a rheology and thixotropy modifier. U.S. Pat. No. 4,873,077, GB 1177420 and DE 69111621 describe a multiplicity of additives for ensuring good load-bearing resistance, effective split prevention, the breaking and tearing of the nails, and a long life for the nail varnish after drying, as a flexible, well-adhering, hard film on the nail.

With the alkoxylation products of the invention it is also possible, furthermore, to bring about physical effects specifically on solid substrates, such as hydrophobic or hydrophilic surface properties, for example. In this context it is also possible, furthermore, for effects of this kind to be subject to an additional stimulus, such as that of the prevailing temperature, for example. As is known from the literature, polyethers in water have what are called cloud points, as a function of temperature, which result from the development with increasing temperature of incompatibility with the surrounding medium. It has been shown that it is possible, via the attachment of silyl-modified polyether chains to different surfaces, to render their contact angles with respect to various liquids—water, for example—a function of temperature.

For the compositions of the invention there exist countless different applications in the field of adhesives, sealants, binders and joint-sealants. They are suitable for countless different substrates, such as, for example, mineral substrates, metals, plastics, glass, ceramic, wood, wood-base materials, natural fibre, skin, hair, epidermal derivatives, horn or else cork, etc. In principle the compositions and/or the foams produced from them are suitable for adhesively bonding any articles. In particular, however, they are highly suitable when the surfaces to be bonded are uneven or else where small fibres or particles, and also cork, for example, are to be joined with one another to form a composite material. This is the case, for example, when adhesive bonding is carried out at fracture sites which, as a result of splintering or warping of materials, no longer fit exactly over one another, or else on the adhesive bonding of skirting boards, coving or other ornamental trims to an uneven wall surface. Here, the foams possess the advantage that they are able to provide effective filling even of cavities.

The modified alkoxylation products of the invention and the corresponding processes for preparing them are described by way of example below, without any intention that the invention should be confined to these exemplary embodiments. Where reference is made below to ranges, general formulae or classes of compound, this is intended to encompass not only the corresponding ranges or groups of compounds that are explicitly mentioned, but also all sub-ranges and sub-groups of compounds which may be obtained by extraction of individual values (ranges) or individual compounds.

Where documents are cited in the context of the present description, the intention is that their content should belong fully to the disclosure content of the present invention.

The invention is further described by the following non-limiting examples which further illustrate the invention, and are not intended, nor should they be interpreted to, limit the scope of the invention.

EXAMPLES

The epoxide oxygen content of the uncapped precursors was determined in the presence of concentrated HCl on the principle of back-titration with aqueous sodium hydroxide solution.

OH numbers were determined in accordance with the cold acetylation method along the lines of Analytical Procedure C-V 17A (98) of the Deutsche Gesellschaft für Fettwissenschaft (DGF). The average molar masses were determined arithmetically from the OH numbers thus determined, or by means of GPC. The epoxide oxygen content of the end products was determined in the presence of concentrated HCl on the principle of back-titration with aqueous sodium hydroxide solution. The viscosity of the products was determined using a rheometer (MCR 301, Anton Paar). Measurement was carried out using a plate/plate geometry with a diameter of 50 mm. The GPC measurements for determining the polydispersity and average molar masses were carried out under the following conditions: column combination SDV 1000/10 000 Å (length 65 cm), temperature 30° C., THF as mobile phase, flow rate 1 ml/min, sample concentration 10 g/l, RI detector, evaluation against polypropylene glycol standard.

For determination of the elongation at break, the alkoxylation product of the formula (I), cured using an Sn catalyst (c: 0.3%) (dioctyltin diketonate, TIB® KAT 223 (TIB Chemicals) under standard conditions (T: 23° C., RAH: 50%, 7 days), was tested along the lines of DIN 53 504, with a test speed of 200 mm/min.

Precursor 1: Alkoxysilylated Alkoxylation Product with Methyl Radical in Alpha Position to the Hydroxyl Group Preparation of alkoxylation products carrying alkoxysilyl groups, by means of DMC catalysts, in accordance with the method disclosed in EP 2 093 244. The epoxide oxygen content of the end products was determined in the presence of concentrated HCl on the principle of back-titration with aqueous sodium hydroxide solution.

A 3-liter autoclave is charged under nitrogen with 140 g of polypropylene glycol (average molar mass 700 g/mol) and 0.22 g of zinc hexacyanocobaltate DMC catalyst and this initial charge is heated with stirring to 130° C. The reactor is evacuated to an internal pressure of 30 mbar in order to carry out distillative removal of any volatile ingredients present. A small amount of propylene oxide is added in order to activate the DMC catalyst, and after 15 minutes and the onset of the reaction, a further 1032 g of propylene oxide are fed in over the course of 1 hour at 130° C. with cooling. Subsequently, simultaneously, 111 g of 3-glycidyloxypropyltriethoxysilane (DYNASYLAN® GLYEO) and 1520 g of propylene oxide are metered in continuously over the course of 1.5 hours at 100° C. with cooling. The 90-minute subsequent reaction at 100° C. is followed by the devolatilization stage. The completed alkoxylation product is cooled to below 80° C. and discharged from the reactor.

The alkoxylation product obtained contains on average per molecule 2 trialkoxysilyl units and has an average molar mass of 14 000 g/mol. Free epoxide groups are not detectable in the end product. The viscosity of the alkoxylation product, determined using a calibrated rheometer, is approximately 10-12 Pa*s at 25° C. and a shear rate of 10 1/s.

Precursor 2: Alkoxysilylated Alkoxylation Product with Methyl Radical in Alpha Position to the Hydroxyl Group Preparation of alkoxylation products carrying alkoxysilyl Groups, by means of DMC catalysts, in accordance with the method disclosed in EP 2 093 244. The epoxide oxygen content of the end products was determined in the presence of concentrated HCl on the principle of back-titration with aqueous sodium hydroxide solution.

A 3-liter autoclave is charged under nitrogen with 140 g of polypropylene glycol (average molar mass 700 g/mol) and 0.22 g of zinc hexacyanocobaltate DMC catalyst and this initial charge is heated with stirring to 130° C. The reactor is evacuated to an internal pressure of 30 mbar in order to carry out distillative removal of any volatile ingredients present. A small amount of propylene oxide is added in order to activate the DMC catalyst, and after 15 minutes and the onset of the reaction, a further 1032 g of propylene oxide are fed in over the course of 1 hour at 130° C. with cooling. Subsequently, simultaneously, 111 g of 3-glycidyloxypropyltriethoxysilane (DYNASYLAN® GLYEO) and 1520 g of propylene oxide are metered in continuously over the course of 1.5 hours at 95° C. with cooling. The 90-minute subsequent reaction at 95° C. is followed by the devolatilization stage. The completed alkoxylation product is cooled to below 80° C. and discharged from the reactor.

The alkoxylation product obtained contains on average per molecule 2 trialkoxysilyl units and has an average molar mass of 14 000 g/mol. Free epoxide groups are not detectable in the end product. The viscosity of the alkoxylation product, determined using a calibrated rheometer, is approximately 10-14 Pa*s at 25° C. and a shear rate of 10 1/s.

Example 1

Precursor 1, prepared by the method specified above, is admixed at T=110° C. with hexamethyldisilazane (HMDS) (0.5 mol per OH function of the alkoxylation product) and oleic acid (1 mol/mol HMDS) as catalyst and the mixture is mixed for 30 minutes. Subsequently, for the distillative removal of resultant ammonia and excess reactants, the reaction is continued under reduced pressure (P<50 mbar). After a reaction time of 60 minutes, the product is cooled with stirring.

During the cooling phase after the reaction, the product is admixed at T=65-70° C. with 0.5% by weight of ethanol and, after about 10 minutes, the excess ethanol is removed by the use of reduced pressure. In this reaction, traces of HMDS present in the product can be removed—they might otherwise lead to further formation of ammonia. As a result of this method, the product becomes free from ammonia odour, which is advantageous especially for all interior applications.

The slightly yellowish product possesses a viscosity of 10-14 Pa*s at 25° C. and a shear rate of 10 1/s and, following addition of dioctyltin acetylacetonate and storage in air overnight, cures to an elastomeric product.

Example 2

Precursor 1, prepared by the method specified above, is admixed at T=110° C. with hexamethyldisilazane (HMDS) (0.5 mol per OH function of the alkoxylation product) and pyridine (0.3 mol/mol HMDS) as catalyst and the mixture is mixed for 30 minutes. Subsequently, for the distillative removal of resultant ammonia and excess reactants, the reaction is continued under reduced pressure (P<50 mbar). After 60 minutes, the product is cooled with stirring.

During the cooling phase after the reaction, the product is admixed at T=65-70° C. with 0.5% by weight of ethanol and, after about 10 minutes, the excess ethanol is removed by the use of reduced pressure. In this reaction, traces of HMDS present in the product can be removed—they might otherwise lead to further formation of ammonia. As a result of this method, the product becomes free from ammonia odour, which is advantageous especially for all interior applications.

The slightly yellowish product possesses a viscosity of 14-16 Pa*s at 25° C. and a shear rate of 10 1/s and, following addition of dioctyltin acetylacetonate and storage in air overnight, cures to an elastomeric product.

Example 3

Precursor 1, prepared by the method specified above, is admixed at 110° C. with the anhydride of propionic acid (1 mol/mol of OH groups of the alkoxylation product). After a reaction time of 240 minutes, residual volatile reactants and products are distilled off with stirring under reduced pressure (P<70 mbar). The product is subsequently cooled with stirring and under reduced pressure. The product possesses a viscosity of 13-19 Pa*s at 25° C. and a shear rate of 10 1/s, and, following addition of dioctyltin acetylacetonate and storage in the air overnight, cures to an elastomeric product.

Example 4

Precursor 1, prepared by the method specified above, is admixed at 60° C. with stearyl isocyanate (1 mol/mol of OH groups of the alkoxylation product). For catalysis, 0.1% by weight of dioctyltin dilaurate is added to the reaction mixture. After a reaction time of 120 minutes, residual volatile reactants and products are distilled off with stirring under reduced pressure (P<70 mbar). The product is subsequently cooled with stirring and under reduced pressure. The product possesses a viscosity of 10-16 Pa*s at 25° C. and a shear rate of 10 1/s, and, following addition of dioctyltin acetylacetonate and storage in the air overnight, cures to an elastomeric product.

Example 5

Precursor 2, prepared by the method specified above, is admixed at T=110° C. with hexamethyldisilazane (HMDS) (0.5 mol per OH function of the alkoxylation product) and oleic acid (1 mol/mol HMDS) as catalyst and the mixture is mixed for 30 minutes. Subsequently, for the distillative removal of resultant ammonia and excess reactants, the reaction is continued under reduced pressure (P<50 mbar). After a reaction time of 60 minutes, the product is cooled with stirring.

During the cooling phase after the reaction, the product is admixed at T=65-70° C. with 0.5% by weight of ethanol and, after about 10 minutes, the excess ethanol is removed by the use of reduced pressure. In this reaction, traces of HMDS present in the product can be removed—they might otherwise lead to further formation of ammonia. As a result of this method, the product becomes free from ammonia odour, which is advantageous especially for all interior applications.

The slightly yellowish product possesses a viscosity of 10-16 Pa*s at 25° C. and a shear rate of 10 1/s and, following addition of dioctyltin acetylacetonate and storage in air overnight, cures to an elastomeric product.

Example 6

Precursor 2, prepared by the method specified above, is admixed at T=110° C. with hexamethyldisilazane (HMDS) (0.5 mol per OH function of the alkoxylation product) and pyridine (0.3 mol/mol HMDS) as catalyst and the mixture is mixed for 30 minutes. Subsequently, for the distillative removal of resultant ammonia and excess reactants, the reaction is continued under reduced pressure (P<50 mbar). After 60 minutes, the product is cooled with stirring.

During the cooling phase after the reaction, the product is admixed at T=65-70° C. with 0.5% by weight of ethanol and, after about 10 minutes, the excess ethanol is removed by the use of reduced pressure. In this reaction, traces of HMDS present in the product can be removed—they might otherwise lead to further formation of ammonia. As a result of this method, the product becomes free from ammonia odour, which is advantageous especially for all interior applications.

The slightly yellowish product possesses a viscosity of 14-17 Pa*s at 25° C. and a shear rate of 10 1/s and, following addition of dioctyltin acetylacetonate and storage in air overnight, cures to an elastomeric product.

Example 7

Precursor 2, prepared by the method specified above, is admixed at 110° C. with the anhydride of propionic acid (1 mol/mol of OH groups of the alkoxylation product). After a reaction time of 240 minutes, residual volatile reactants and products are distilled off with stirring under reduced pressure (P<70 mbar). The product is subsequently cooled with stirring and under reduced pressure. The product possesses a viscosity of 14-18 Pa*s at 25° C. and a shear rate of 10 1/s, and, following addition of dioctyltin acetylacetonate and storage in the air overnight, cures to an elastomeric product.

Example 8

Precursor 2, prepared by the method specified above, is admixed at 70° C. with stearyl isocyanate (1 mol/mol of OH groups of the alkoxylation product). For catalysis, 0.1% by weight of dioctyltin dilaurate is added to the reaction mixture. After a reaction time of 120 minutes, residual volatile reactants and products are distilled off with stirring under reduced pressure (P<70 mbar). The product is subsequently cooled with stirring and under reduced pressure. The product possesses a viscosity of 11-16 Pa*s at 25° C. and a shear rate of 10 1/s, and, following addition of dioctyltin acetylacetonate and storage in the air overnight, cures to an elastomeric product.

Example 9

Precursor 2, prepared by the method specified above, is admixed at 60° C. with n-butyl isocyanate (1 mol/mol of OH groups of the alkoxylation product). For catalysis, 0.1% by weight of a bismuth carboxylate preparation (TIB KAT 720, TIB Chemicals) is added to the reaction mixture. After a reaction time of 120 minutes, residual volatile reactants and products are distilled off with stirring under reduced pressure (P<70 mbar). The product is subsequently cooled with stirring and under reduced pressure. The product possesses a viscosity of 13-16 Pa*s at 25° C. and a shear rate of 10 1/s, and, following addition of dioctyltin acetylacetonate and storage in the air overnight, cures to an elastomeric product.

Example 10

The alkoxylation product formed from precursor 2 is mixed under dry inert gas and at 70° C. with 2 mol of IPDI per mole of alkoxylation product and with 0.1% by weight of bismuth carboxylate catalyst. After 3 hours, 1 mol of 1-butanol per mole of IPDI is added and the mixture is heated to 90° C. After a further 3 hours, the product is cooled to below 60° C. and discharged. The clear product possesses a viscosity of 80-110 Pa*s at 25° C. and a shear rate of 10 1/s, and, following addition of dioctyltin acetylacetonate and storage in the air overnight, cures to an elastomeric product.

Example 11

The diisocyanate IPDI is combined with one equivalent of 1-butanol and 0.1% by weight of bismuth catalyst and the combination is stirred under dry inert gas for 3 hours at 70° C. The remaining catalyst and the alkoxylation product (precursor 2) are then added. The amount of the IPDI used to start with, and hence also the amount of 1-butanol, are to be selected here such that 1 mol of IPDI is added for each OH group of the alkoxylation product that is then added. The mixture is stirred for 3 hours, then cooled to below 60° C. and discharged. The clear product possesses a viscosity of 65-75 Pa*s at 25° C. and a shear rate of 10 1/s, and, following addition of dioctyltin acetylacetonate and storage in the air overnight, cures to an elastomeric product.

Example 12

The diisocyanate IPDI is combined with one equivalent of a propylene oxide polyether prepared starting from butanol and having a molar mass of 400 g/mol and the combination is stirred under dry inert gas for 3 hours at 70° C. The catalyst and the alkoxylation product (precursor 2) are then added. The amount of the IPDI used to start with, and hence also the amount of the polyether, are to be selected here such that 1 mol of IPDI is added for each OH group of the alkoxylation product that is then added. The mixture is stirred for 3 hours, then cooled to below 60° C. and discharged. The transparent and colourless product possesses a viscosity of 48-52 mPa*s at a temperature of 25° C. and a shear rate of 10 1/s.

Comparative Experiment

For comparison, precursor 1, prepared in accordance with the aforementioned specification, without subsequent end-capping, is heated under reduced pressure at 110° C. for 60 minutes. The product possesses a viscosity of 28 Pa*s at a shear rate of 10 1/s and a temperature of 25° C.

Storage Tests

To determine the storage life, the products prepared above were subjected to a test under temperature stress, and the self-condensation of the compounds was ascertained. In mixtures with other condensable substrates and/or in the presence of further additives and adjuvants, divergent results may be expected and may also be obtained.

The products originating from the examples given above, together with 0.5% by weight of dioctyltin acetylacetonate (TIB® KAT 223, TIB Chemicals), are introduced into glass vessels with screw lids, given an airtight seal and subjected to an accelerated storage test at 60° C. The end of the storage life test is reached when the material has undergone partial crosslinking (viscosity, measured on a rheometer at 25° C. and a shear rate of 10 1/s, >100 Pa*s), but the test was discontinued anyway on reaching 25 days.

TABLE 1

| | Storage test | | | | |
| --- | --- | --- | --- | --- | --- |
| | Example 1 | Example 2 | Example 3 | Example 4 | Comparative precursor 1 |
| Storage life | >25 days | >25 days | 14 days | >25 days | <2 days |
| Elongation at break | 85% | 65% | 75% | 95% | 53% |
| | Comparative precursor 2 | Example 5 | Example 6 | Example 7 | Example 8 |
| Storage life | <2 days | >25 days | >25 days | 12 days | >25 days |
| Elongation at break | 57% | 85% | 66% | 68% | 100% |
| | Example 9 | Example 10 | Example 11 | Example 12 | |
| Storage life | >25 days | >25 days | >25 days | >25 days | |
| Elongation at break | 95% | 100% | 90% | 94% | |

As set out in the table shown above, there is a considerable increase in the storage life when the process of the invention is employed, as compared with the reference represented in the comparative experiment. The experiment was ended after a storage phase of 25 days at 60° C.

Surprisingly it has been found that, in addition to the improvement in the storage life, there is also an improvement in the elongation at break. The elongation at break is of great importance for numerous practical applications, as for example in the context of use as binders in adhesive and sealant formulations. As set out in the table, the elongation at break is influenced in an advantageous way.

For the storage tests, the silyl polyether was mixed with a dibutyl-Sn diketonate (TIB® KAT 226 (TIB Chemicals)) or with a dioctyl-Sn diketonate catalyst (TIB® KAT 223) (c(catalyst): 0.5% by weight). Additionally, if necessary, vinyltrimethoxysilane (obtainable, for example, as Dynasylan® VTMO (Evonik Industries)) was added as an additive for chemical drying. The materials were mixed in a mixer (Speedmixer DAC 600 FVZ (Hausschild)) for 60 seconds (2300 rpm) and then transferred to Euro cartridges and sealed with a suitable plunger. After a day of storage at room temperature, the cartridges were heated to 60° C. in a drying cabinet and stored at that temperature. After different times, a cartridge was opened and its contents inspected for partial crosslinking. This is done by extruding the material and assessing its fluidity. In the event of a marked increase in the viscosity above 100 Pa*s and/or a loss of fluidity, the material is assessed as being partially crosslinked.

As an example of a formulation in accordance with the invention, the following examples may be identified, but the application of this invention is expressly not confined to these examples. The formulations below may be formulated in principle with any of the alkoxylation products of the invention prepared in accordance with the examples indicated above, despite the fact that the examples identify a specific product.

TABLE 2

Curable formulation 1:

| Ingredient | Mass fraction as proportion of total formulation |
|---|---|
| Alkoxylation product of Example 1 | 29.2% by weight |
| Diisoundecylene phthalate (plasticizer) | 15.0% by weight |
| Omyacarb ® 2 GU (filler) | 50.0% by weight |
| Vinyltrimethoxysilane (dryer) | 1.0% by weight |
| Oligomeric aminosilane [Dynasylan ® 1146] (adhesion promoter) | 1.5% by weight |
| Fumed silica [Aerosil ® R202] (rheological additive) | 3.0% by weight |
| Dioctyltin diketonate [TIB ® KAT 223] (catalyst) | 0.3% by weight |

TABLE 3

Curable formulation 2:

| Ingredient | Mass fraction as proportion of total formulation |
|---|---|
| Alkoxylation product of Example 2 | 30.25% by weight |
| Diisoundecylene phthalate (plasticizer) | 7.5% by weight |
| Socal ® U1S2 (filler) | 55.7% by weight |
| Vinyltrimethoxysilane (dryer) | 0.75% by weight |
| Aminosilane [Dynasylan ® DAMO] (adhesion promoter) | 0.5% by weight |
| Oligomeric aminosilane [Dynasylan ® 1146] (adhesion promoter) | 1.5% by weight |
| Irganox ® 1135 (stabilizer) | 0.5% by weight |
| Fumed silica [Aerosil ® R202] (rheological additive) | 3.0% by weight |
| Dioctyltin diketonate [TIB ® KAT 223] (catalyst) | 0.3% by weight |

TABLE 4

Curable formulation 3:

| Ingredient | Mass fraction as proportion of total formulation |
|---|---|
| Alkoxylation product of Example 3 | 22.2% by weight |
| Phenyl alkanesulphonate [Mesamoll ®, Bayer] (plasticizer) | 21.0% by weight |
| Sikron ® SF600 (filler) | 49.5% by weight |
| Vinyltrimethoxysilane (dryer) | 1.0% by weight |
| Oligomeric aminosilane [Dynasylan ® 1146] (adhesion promoter) | 1.5% by weight |
| Amide wax [Crayvallac ® SLX] (rheological additive) | 3.5% by weight |
| Tinuvin ® 292 (stabilizer) | 0.5% by weight |
| Tinuvin ® 1130 (stabilizer) | 0.5% by weight |

TABLE 4-continued

Curable formulation 3:

| Ingredient | Mass fraction as proportion of total formulation |
|---|---|
| Dioctyltin diketonate [TIB ® KAT 223] (catalyst) | 0.3% by weight |

TABLE 5

Curable formulation 4:

| Ingredient | Mass fraction as proportion of total formulation |
|---|---|
| Alkoxylation product of Example 9 | 51.3% by weight |
| Diisoundecylene phthalate (plasticizer) | 11.2% by weight |
| Sikron ® SF600 (filler) | 30.0% by weight |
| Vinyltrimethoxysilane (dryer) | 0.7% by weight |
| Oligomeric aminosilane [Dynasylan ® 1146] (adhesion promoter) | 1.5% by weight |
| Amide wax [Crayvallac ® Super] (rheological additive) | 4.0% by weight |
| Tinuvin ® 292 (stabilizer) | 0.5% by weight |
| Tinuvin ® 1130 (stabilizer) | 0.5% by weight |
| Dibutyltin diketonate [TIB ® KAT 226] (catalyst) | 0.3% by weight |

The components of the stated formulations are incorporated in accordance with the methods known to the skilled person, it being necessary to place particular importance on the absence of moisture and the avoidance of air inclusions when formulating. This is typically done by formulating under reduced pressure.

All of the formulation examples identified here cure in layers of <1.5 mm overnight, or, in layers with a thickness of 1.5 mm to 10 mm, over the course of not more than 8 days, completely, to form elastomeric products.

In the case of alkoxysilyl-substituted alkoxylation products of the formula (I) which in accordance with the invention have been provided terminally with a radical capping the hydroxyl group, in the form of a urethane, ester, carboxylic acid or trialkylsilyl group, there is a markedly improved storage life found in the presence of catalyst. In formulations, as well, these alkoxylation products exhibit significantly improved storage behaviour, characterized by later gelling of the formulation. The storage time before gelling of the formulations was increased with the inventively prepared alkoxylation product to >25 days (see Table 1). This, accordingly, represents a marked improvement over the original alkoxylation products of the prior art, and allows the products to be used for the first time in the applications and formulations referred to by way of example above. Surprisingly it has also been observed that the elongation behaviour of the products crosslinked by hydrolytic condensation can be improved significantly by means of the structures according to the invention. Accordingly, there is a significant improvement in the elongation at break of the polymers.

Having thus described in detail various embodiments of the present invention, it is to be understood that the invention defined by the above paragraphs is not to be limited to particular details set forth in the above description as many apparent variations thereof are possible without departing from the spirit or scope of the present invention.

Further subject matter of the invention will become apparent from the claims, whose disclosure content is a full part of the present description.

The invention claimed is:
1. An alkoxylation product of the general formula (I):

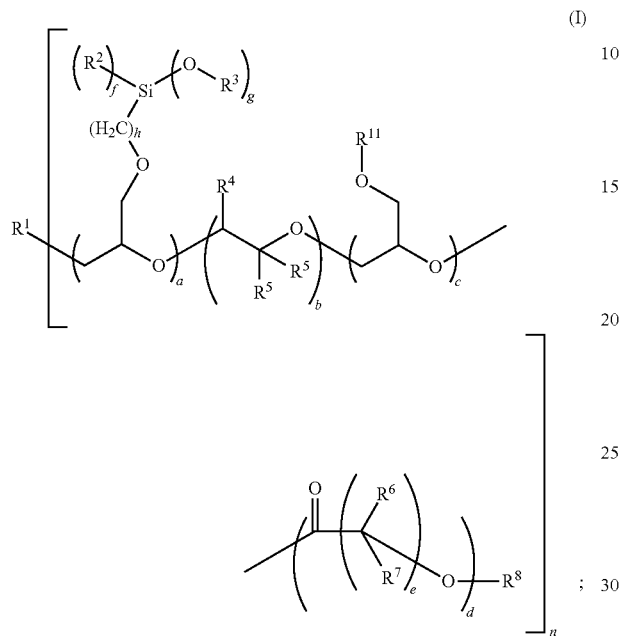

where:
n=1 to 6;
R$^1$ is:
an n-functional radical selected from the group consisting of polyoxyalkylene radicals, polyetheralkoxy radicals, and phenolic radicals; or
is derived from a monohydroxylated or polyhydroxylated compound selected from the group consisting of alcohol, polyetherol, polyesterol, siloxane, perfluorinated polyetherol, or sugar;
wherein the carbon chain of R$^1$ optionally carries substituents comprising pendant alkoxysilyl groups;
R$^2$=an alkyl group having 1 to 8 carbon atoms;
R$^3$=an alkyl group having 1 to 8 carbon atoms;
R$^4$=a hydrogen radical or an alkyl group having 1 to 8 carbon atoms;
R$^5$=independently at each occurrence a hydrogen radical, an alkyl group having 1 to 20 carbon atoms, or an aryl or alkaryl group;
R$^6$ and R$^7$=independently at each occurrence the same as R$^5$; and
R$^8$=an endgroup of the formula IIa, formula IIb, or formula IIc;
wherein formula IIa is:

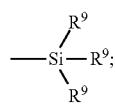

where R$^9$=independently at each occurrence:
a linear or branched, saturated or unsaturated alkyl group having 1 to 30 carbon atoms; or
an aryl or alkaryl group;
wherein formula IIb is:

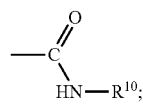

where R$^{10}$=independently at each occurrence:
a linear or branched, saturated or unsaturated, optional substituted alkyl group having 1 to 30 carbon atoms; or
an aryl or alkaryl group; or
a group -A(T)$_x$, where:
A=hydrocarbon residue, that is optionally substituted by halogen atoms;
x=1 to 4; and
T=independently at each occurrence, —N=C=O or —NH—C(O)—X, where:
X is O—R$^{12}$ or NH—R$^{12}$, where:
R$^{12}$ is, independently at each occurrence, a hydrocarbon residue, that is optionally interrupted by hetero atoms; or
X is a residue of formula Ia;

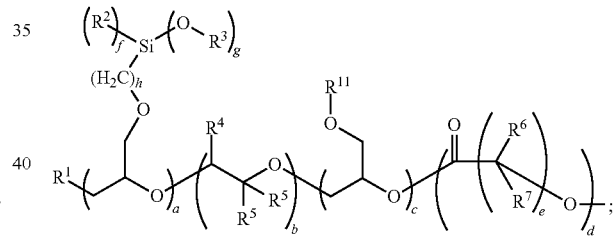

and
wherein formula IIc is:

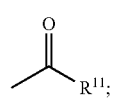

where R$^{11}$ is a methyl, ethyl, propyl, or isopropyl radical, or phenyl radical;
where:
a=0 to 1000, with the proviso that a must be greater than or equal to 1 if R$^1$ carries no substituents with alkoxysilyl groups or is itself not substituted directly by alkoxysilyl groups;
b=1 to 1000;
c=0 to 1000; and
d=0 to 1000;
with the proviso that the groups having the indices a, b, c and d are freely interchangeable over the molecular chain; and where:
  e=1 to 10;
  g+f=3 and g is at least equal to 1; and
  h=0, 1, 2, 3, 4, 5, 6, 7, 8, 9 or 10;
with the proviso that the various monomer units and also the fragments with the indices a, b, c and d, and also the polyoxyalkylene chain of the substituent $R^1$, are optionally of blockwise construction with one another, or else are optionally subject to a random distribution and, moreover, are freely interchangeable with one another.

2. The alkoxylation product according to claim 1; wherein $R^1$ is a radical which is derived from polyols, EO-polyetherols, PO-polyetherols or EO/PO-polyetherols, polyesterols, glycerol, polyglycerol, polyTHF, phenol, alkyl- and arylphenols, bisphenol A, novolaks, hydroxycarboxylic acids, siloxanols, siloxanediols, castor oil, Ricinus oil, ricinoleic acid, sugar, lactones, cellulose, methanol, ethanol, n- or isopropanol, n-, iso-, or tert-butanol, 2-butanol, octanol, allyl alcohol, dodecanol, stearyl alcohol, 2-ethylhexanol, cyclohexanol, benzyl alcohol, ethylene glycol, propylene glycol, di-, tri-, or polyethylene glycol, 1,2-propylene glycol, di- or polypropylene glycol, OH-functional polyolefins, OH-functional polybutadiene, 1,4-butanediol, 1,6-hexanediol, 1,4-butynediol, tetramethyldecynediol, trimethylolpropane, pentaerythritol, sorbitol, cellulose sugar, lignin, or hydroxyl-carrying compounds based on natural substances; and
  wherein $R^1$ itself optionally carries alkoxysilyl groups or carries substituents which carry alkoxysilyl groups.

3. The alkoxylation product according to claim 1; characterized in that it has a trialkylsilyl endblock or a urethane endblock or an ester endblock.

4. A process for preparing alkoxylation products of claim 1, by utilizing DMC catalysis, from starter compounds $R^1$—H which carry hydroxyl groups, comprising:
  performing an alkoxylation reaction of alkylene oxides and epoxy-functional alkoxysilanes, and, optionally, glycidyl compounds, and/or lactones to produce addition products; and
  reacting, in a last step, the addition products with monosilanol-forming compounds, or isocyanates, or linear carboxylic acids or their carboxylic anhydrides.

5. The process according to claim 4; wherein monosilanol-forming compounds are utilized, and are selected from the group consisting of N,O-bis(trimethylsilyl)acetamide, N,O-bis(triethylsilyl)acetamide, N-(trimethylethylsilyl)acetamide, bistrimethylsilylurea, hexamethyldisilazane, 1,1,3,3-tetramethyldisilazane, trimethylsilyl phenoxide, trimethylsilyl alkoxide, and dimethylsilyldiethylamine.

6. The process according to claim 4; wherein carboxylic acids or their carboxylic anhydrides are utilized, and are selected from the group consisting of acetic and propionic acid, and their anhydrides.

7. The process according to claim 4; wherein isocyanates are utilized, and are:
  monoisocyanates selected from the group consisting of isopropyl, n-butyl, isobutyl, pentyl, hexyl, heptyl, octyl, nonyl, isopropylphenyl, tolyl, phenyl, nitrophenyl, stearyl, dinitrophenyl, and cyclohexyl isocyanate; or
  difunctional isocyanates selected from the group consisting of toluene 2,4-diisocyanate (TDI), diphenylmethane diisocyanate, methylenediphenyl diisocyanate (MDI), hexamethylene diisocyanate (HMDI), polymeric diphenylmethane diisocyanate (PMDI), isophorone diisocyanate (IPDI), and 4,4'-diisocyanatodicyclohexylmethane (H12MDI); or
  trifunctional isocyanates selected from the group consisting of triphenylmethane triisocyanate, 1,3,5-benzene triisocyanate, and 2,4,6-toluene triisocyanate.

8. A curable composition comprising: at least one alkoxylation product according to claim 1.

9. The curable composition according to claim 8, further comprising:
  at least one curing catalyst.

10. The curable composition according to claim 9;
  wherein the curable composition is in the form of a solution, emulsion, dispersion, or suspension; and
  wherein the curable composition optionally comprises an emulsifier.

11. The curable composition according to claim 10, further comprising:
  at least one further additive selected from the group consisting of diluents, catalysts, plasticizers, fillers, solvents, emulsifiers, adhesion promoters, rheological additives, additives for chemical drying, stabilizers against thermal and/or chemical exposures and/or exposures as a result of ultraviolet and visible light, thixotropic agents, flame retardants, blowing agents, defoamers, deaerating agents, film-forming polymers, antimicrobial and preservative compounds, antioxidants, dyes, colorants, pigments, antifreeze agents, fungicides, reactive diluents, complexing agents, wetting agents, co-crosslinkers, spraying aids, vitamins, growth substances, hormones, active pharmacological ingredients, fragrances, free-radical scavengers, and other adjuvants.

12. The curable composition according to claim 11, further comprising:
  at least one chemical or physical blowing agent.

13. An adhesive or sealant or coating composition comprising:
  a curable composition according to claim 8.

14. A moulding, liquid paste, powder-coating hardener, particle, woven fabric, or composite material produced utilizing a curable composition according to claim 8.

15. The moulding according to claim 14; wherein the moulding is in the form of flame-retardant thermoplastic polymer compounds, flame-retardant partitions, or cable sheathing.

16. A method of sealing, and/or adhesively bonding, and/or foaming, and/or for coating a sheetlike or a particulate or a fibrous substrate surface, comprising:
  adding the curable composition of claim 8 to the surface.

17. The method of claim 16; wherein the surface is a porous or non-porous, particulate or sheetlike substrate surface, and is selected from the group consisting of:
  construction elements, components, metals and construction materials, iron, steel, stainless steel and cast iron, ceramic materials comprising solid metal oxides or non-metal oxides or carbides, aluminium oxide, magnesium oxide or calcium oxide, and also mineral substrates, organic substrates, composite materials, wood composites, cork, wood or cork chipboard and fibreboard, MDF board, WPC articles, cork articles, laminated articles, ceramics, natural fibres, synthetic fibres, wood, and combinations thereof.

* * * * *